United States Patent
Shiohara

(10) Patent No.: US 6,343,158 B1
(45) Date of Patent: Jan. 29, 2002

(54) APPARATUS FOR CONVERTING GRAY LEVELS OF AN IMAGE, A METHOD THEREOF, A PROGRAM STORAGE DEVICE THEREOF, AND AN INFRARED CAMERA

(75) Inventor: Morito Shiohara, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 08/889,876

(22) Filed: Jul. 8, 1997

(30) Foreign Application Priority Data

Dec. 18, 1996 (JP) .............................................. 8-338633

(51) Int. Cl.$^7$ ............................. G06K 9/44; G06T 5/20; G09G 5/10; H04N 1/409
(52) U.S. Cl. ....................... 382/261; 382/264; 382/266; 382/128; 345/590; 345/611; 345/694
(58) Field of Search .................................. 382/266, 264, 382/261, 260, 270, 173, 199, 251, 128, 131; 345/590, 611, 694, 589, 690

(56) References Cited

U.S. PATENT DOCUMENTS

| 5,012,333 A | * 4/1991 | Lee et al. ..................... 358/520 |
| 5,268,773 A | * 12/1993 | Park et al. .................... 358/466 |
| 5,493,622 A | * 2/1996 | Tsuchino et al. ........... 382/132 |

FOREIGN PATENT DOCUMENTS

| EP | 377386 | * 7/1990 | ............ H04N/1/40 |
| EP | 971315 | * 1/2000 | ............ G06T/5/00 |
| JP | 4-290177 | * 10/1992 | ............ H04N/1/40 |
| JP | 7-245709 | 9/1995 | |

OTHER PUBLICATIONS

Hau–Ming, Huang et al., "The Dynamic Range Normalization of Dualband (3–5UM And 8–12UM) Thermal Image", International Journal of Infrared and Millimeter Waves, vol. 13, No. 8, Aug. 1, 1992, pp. 1205–1215.
Patent Abstracts of Japan, vol. 018, No. 593, (E–1629), Nov. 11, 1994 & JP 06 225151 A (Victor Co. of Japan LTD), Aug. 12, 1994.
Patent Abstracts of Japan, vol. 018, No. 246 (E–1546), May 11, 1994 & JP 06 030330 A (Matsushit Electric Ind. Co. LTD), Feb. 4, 1994.

* cited by examiner

Primary Examiner—Scott Rogers
(74) Attorney, Agent, or Firm—Staas & Halsey, LLP

(57) ABSTRACT

An apparatus for converting gray levels of an image, a method thereof, a program storage device thereof, and an infrared camera. The object of the present invention is to provide an apparatus for converting gray levels into fewer gray levels without missing a local gradation, a method thereof, a program storage device thereof, and an infrared camera to which the present invention is applied. A positive mask image (C) and a reversed mask image (C') are obtained the edge detected image (B) which is produced by emphasizing edges of an original image (A). A low frequency component (D) is obtained by performing an edge preserving smoothing operation for A masked with C, and performing a non-edge preserving smoothing operation for A masked with C'. A high frequency component (E) is obtained by calculating of (A–D). After D is compressed to D' and E is emphasized to E', an output image (F') is obtained by adding D' and E'.

29 Claims, 19 Drawing Sheets

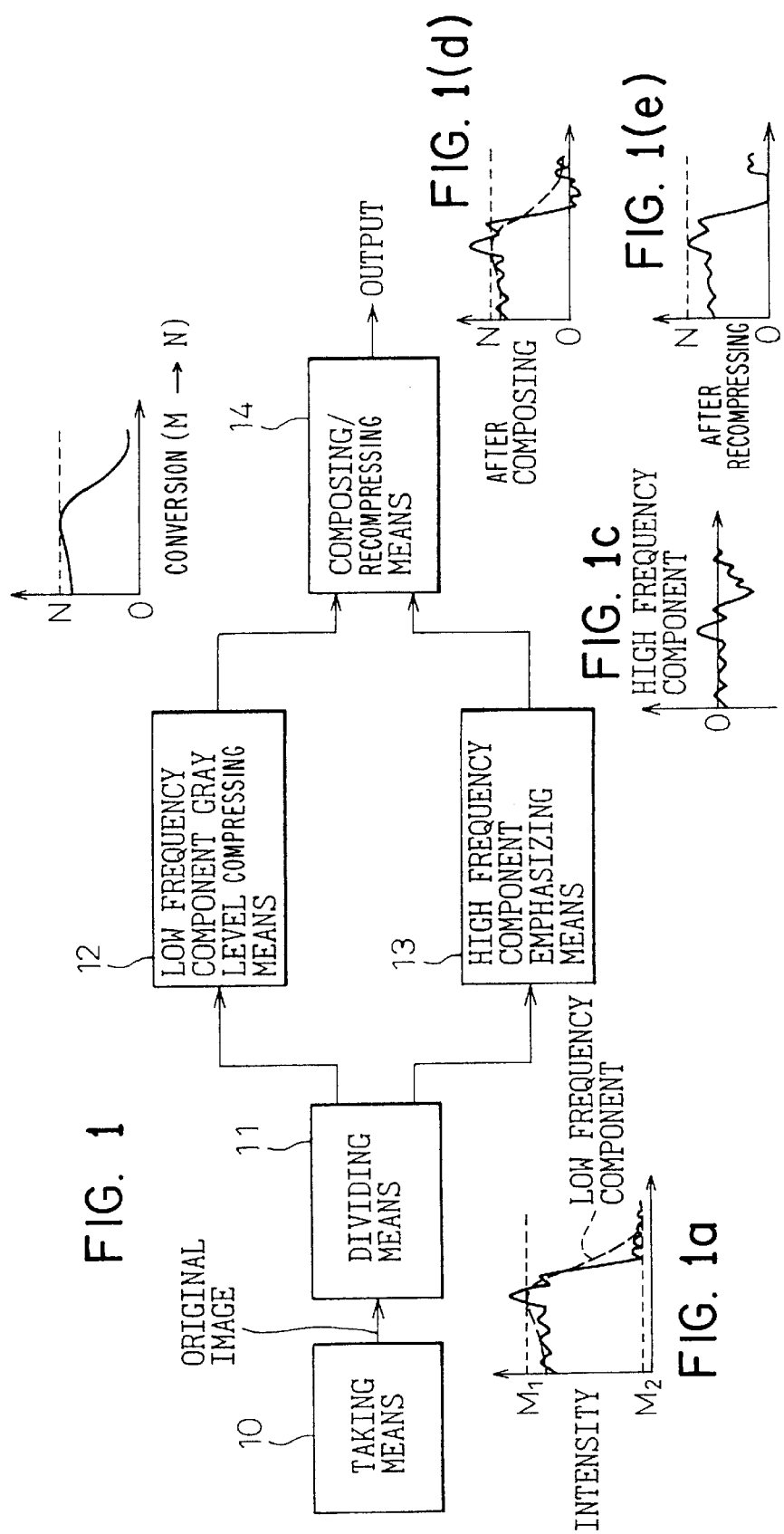

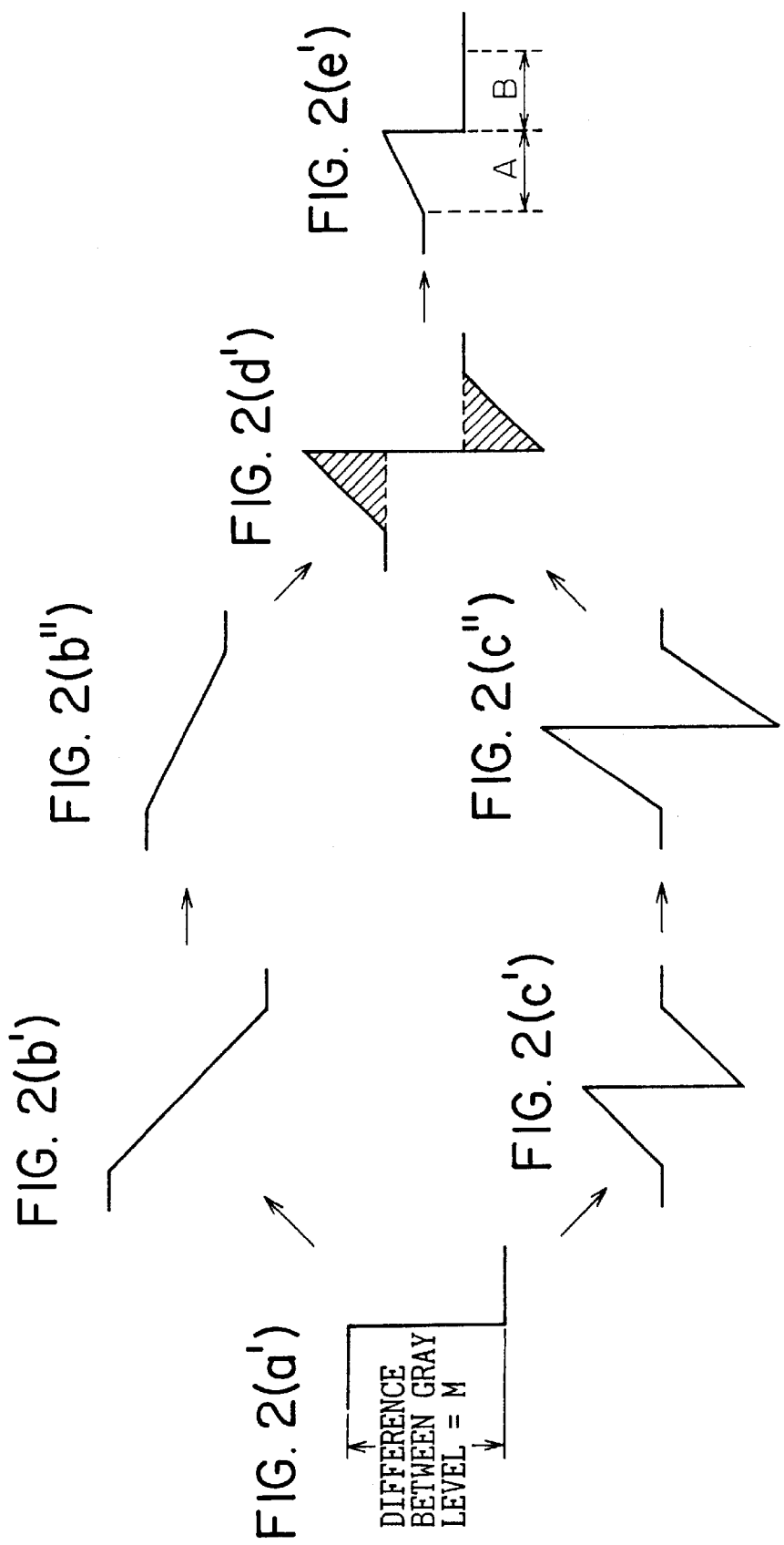

APPARATUS FOR CONVERTING GRAY LEVELS OF AN IMAGE, A METHOD THEREOF, A PROGRAM STORAGE DEVICE THEREOF, AND AN INFRARED CAMERA

BACKGROUND OF THE INVENTION

1. Field of the Invention

This invention relates to an apparatus for converting gray levels of an image, a method thereof, a program storage device thereof, and an infrared camera, and especially relates to an apparatus for converting gray levels of an image with multiple gray levels into fewer gray levels, a method thereof, a program storage device thereof, and an infrared camera to which the present invention is applied.

2. Description of the Related Art

There are images with multi-gray levels, for example 4096 gray levels to get a high resolution (which corresponds to 12 bit resolution), such as an infrared image taken by an infrared camera, a medical image taken by a computer tomography camera, etc.

Gray levels of a generally used display unit, however, are less than 256 (which corresponds to 8 bit resolution), and a gray level conversion is required to display an image with multiple gray levels on a generally used display unit.

The following problems may be caused when an original image is converted using a simple linear converting method.

For example, in an original image taken by an infrared camera, the intensity of objects with relatively high temperature (for example, people) is high, and the intensity of other objects with relatively low temperature (for example, a background) is low. When a simple linear conversion is applied to the image, the intensity of objects with relatively high temperature becomes high but lacks fine gradation. The intensity of objects with relatively low temperature becomes low but lacks a fine gradation.

SUMMARY OF THE INVENTION

Accordingly, the object of the present invention is to provide an apparatus for converting gray levels into fewer gray levels without missing a local gradation, a method thereof, a program storage device thereof, and an infrared camera to which the present invention is applied.

According to one aspect of the present invention, there is provided an apparatus for dividing an original image with multiple gray levels into the low-frequency component which represents a broad gradation of the original image and the high-frequency component which represents a local gradation of the original image; and changing the dividing characteristic used in said dividing means in accordance with an edge strength defined as a difference between the gray levels of neighbouring pixels.

An apparatus according to the first invention, can prevent a local gradation from being lost from the low-frequency component.

According to another aspect of the present invention, there is provided an apparatus further comprising a means for compressing gray levels of the low-frequency component divided by said dividing means into fewer gray levels, and a means for composing the compressed low frequency component with the high-frequency component.

An apparatus according to the second invention can prevent a local gradation from being lost from the low frequency component when the image with multi gray levels is displayed on a generally used display unit with fewer gray levels.

According to another aspect of the present invention, there is provided an apparatus, wherein said dividing means extracts a low frequency component from an original image with a dividing characteristic which is modified in accordance with an edge strength detected by an edge strength detecting means.

An apparatus according to the third invention adds edges having large gray level difference into the low frequency component.

According to another aspect of the present invention, there is provided an apparatus comprised a means for dividing pixels in an original image into an edge group which consists of pixels within a fixed width on both sides of an edge, and a non-edge group which consists of pixels except pixels in said edge group; and a means for extracting a low frequency component using an edge preserving smoothing filter for pixels in said edge group and using a non edge preserving smoothing filter for pixels in said non-edge group.

An apparatus according to the fourth invention, does not need to determine which one of said edge preserving smoothing filter or said non-edge preserving smoothing filter, is applied for extracting the low frequency component for every pixel, because pixels of the original image are previously divided into the two groups before extraction.

According to another aspect of the present invention, there is provided an apparatus which increases the size of a smoothing filter as edge-strength increases.

An apparatus according to the fifth invention extracts a low frequency component using a small size filter for the pixels in the edge group in order to keep edges, and using a large size filter for the pixels in the non-edge group.

According to another aspect of the present invention, there is provided an apparatus comprised a means for dividing pixels in an original image into an edge group which consists of pixels within a fixed width on both sides of edges, and a non-edge group which consists of pixels other than pixels in said edge group; and a means for extracting a low frequency component using a small size filter for pixels in said edge group and using a large size filter for pixels in said non-edge group.

An apparatus according to the sixth invention, does not need to determine which one of said small size filter or said large size filter is applied for extracting the low frequency component every pixel, because pixels of the original image are previously divided into two groups.

According to another aspect of the present invention, there is provided an apparatus comprised a means for dividing an original image into a low-frequency component and a high frequency component; a means for compressing gray levels of said low frequency component into fewer gray levels; a means for emphasizing said high frequency component; and a means for displaying an image composed from said compressed low frequency component and said emphasized high frequency component.

An apparatus according to the seventh invention, can display an image with multi-gray levels in a low resolution monitor without losing fine gradation.

According to another aspect of the present invention, there is provided a program storage device for storing a program executable to perform any one of the above-mentioned inventions.

According to further aspect of the present invention, there is provided an infrared camera to which the present invention is applied.

BRIEF DESCRIPTION OF THE DRAWINGS

FIG. 1 is a diagram to explain a method for converting gray levels of an image;

FIG. 2 is a diagram to explain the problem to be solved by the present invention;

DETAILED DESCRIPTION OF THE INVENTION

Figure 3A:
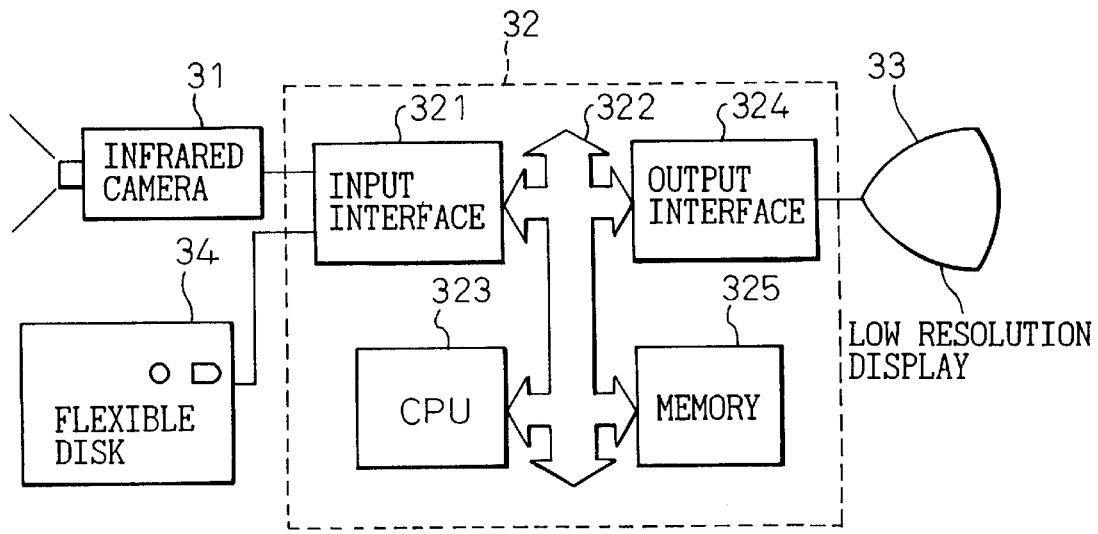
FIGS. 3(A) and 3(B) are diagrams to show a structure of a preferred embodiment.

FIG. 1 is a diagram to explain a method for converting gray levels of an image with multiple gray levels (M levels) into fewer gray levels N (N<M) in order to solve the above-described conventional problem, and this method is comprised of a means for taking an original image 10; a means for dividing the image into a low frequency component which represents a broad gradation and a high-frequency component which represents a local gradation 11; a low frequency component gray level compressing means for compressing the gray levels of the low frequency component from M levels to N' levels (where M<N'≧N) 12; a means for emphasizing the gray levels of the high frequency component 13; a composing/recomposing means for composing the compressed low frequency component with the emphasized high frequency component and recompressing the gray levels of the composed images to N levels 14.

An original image data generated from an adequate means other than the means 10 may be directly applied to the means 11.

Note, a linear conversion method, a non-linear conversion (γ correction) method, a histogram projection method, a histogram equalization method etc. can be applied for compressing. A linear emphasis method, etc. can be applied for emphasizing.

In FIG. 1, a waveform which represents changes of intensity along a horizontal scanning line is also shown. (a) denotes a waveform corresponding to the original image (solid line) and a waveform corresponding to the low frequency component (dotted line); (b) denotes a waveform corresponding to the compressed low-frequency component; (c) denotes a waveform corresponding to the emphasized high-frequency component; (d) "AFTER COMPRESSING" denotes a waveform corresponding to the composed image; and (e) "AFTER RECOMPRESSING" denotes an output waveform after recompressing.

At first, by smoothing the original image taken by a taking means 10 using a mean value filter, a Gaussian filter, etc., a low-frequency component of the original image is obtained, and its maximum intensity is M1 and its minimum intensity is M2 (shown by the dotted line in (a)).

The gray levels of the low frequency component is compressed from (M1−M2+1) levels to N levels by the compressing means 12.

The high frequency component which is obtained by subtracting the uncompressed low frequency component from the original image is emphasized, for example two times, to produce the emphasized high-frequency component (c) by the emphasizing means 13.

A composed image is obtained by adding the compressed low frequency component (b) and the emphasized high frequency component, and an output image is produced by recompressing the composed image so that the composed image has fewer than N gray levels after its negative intensity has been cut.

However, it cannot be avoided, in the above-mentioned method, to lose fine gradation near portions with considerably large gray level difference between neighbouring pixels (hereafter, edges) when a smoothing operation which is essential for gray level conversion is performed on the original image with sharp edges.

FIG. 2 is a diagram to explain the above-mentioned problem. When a smoothing operation is performed to an original image containing a portion (a') which has M level step changes of gray levels, the low-frequency component of the original image (b') has a ramp change instead of a step change. The slope of the ramp change becomes more gradual as the filter with the larger size is applied to reject noise securely.

Because the high frequency component (c') is obtained from the calculation of [(a')−(b')], it gradually increases to the positive side, abruptly reverses from the positive side to the negative side, and then gradually returns to zero.

Therefore, the image (d') which is composed of the converted low frequency component (b") with the emphasized high frequency component (c") made from the pre-emphasized high frequency component (c') has an overshoot portion and an undershoot portion shown by shadow.

When the gray levels of the image (e') are reconverted after cutting the negative intensity portion, that is, the undershooting portion from the composed image (d') is displayed on a low resolution display unit, the (A) portion is displayed as higher intensity than the original image, and (B) portion is displayed as minimum intensity, that is, a black zone.

It is not avoidable to lose fine gradation near an edge because a high intensity zone is produced along the one side of the edge, and a minimum intensity zone is produced along the another side of the edge. This is due to apply a smoothing filter with a fixed size for all pixels of the original image for extracting the low frequency component that is, for smoothing.

Accordingly, the present invention changes a dividing characteristic for dividing a low frequency component from the original image so that fine gradation is not lost.

FIG. 3(A) is a constitution of an one embodiment of a gray level converting apparatus according to the present invention, and the apparatus is comprised of an infrared camera 31, a microcomputer 32, a low resolution display unit which can display a relatively few gray levels (for example, 256 levels) 33, and an external storage (for example, a flexible disk) 34.

The video signal outputted from the infrared camera 31 has multi-gray levels (for example 4096 levels) and is fetched by the microcomputer 32 through an input interface 321.

The microcomputer is composed of not only the input interface 321, but also a bus 322, a CPU 323, an output interface 324, and a memory 325, and executes a gray level converting program stored in the external storage 34.

That is, the gray level converting program is stored in the external storage 34, is fetched by the CPU 323 though the input interface 321 before executing a gray level converting operation, and is executed in the CPU 323. Then a converted image is displayed on the display unit 34 though the output interface 324.

Figure 3B:
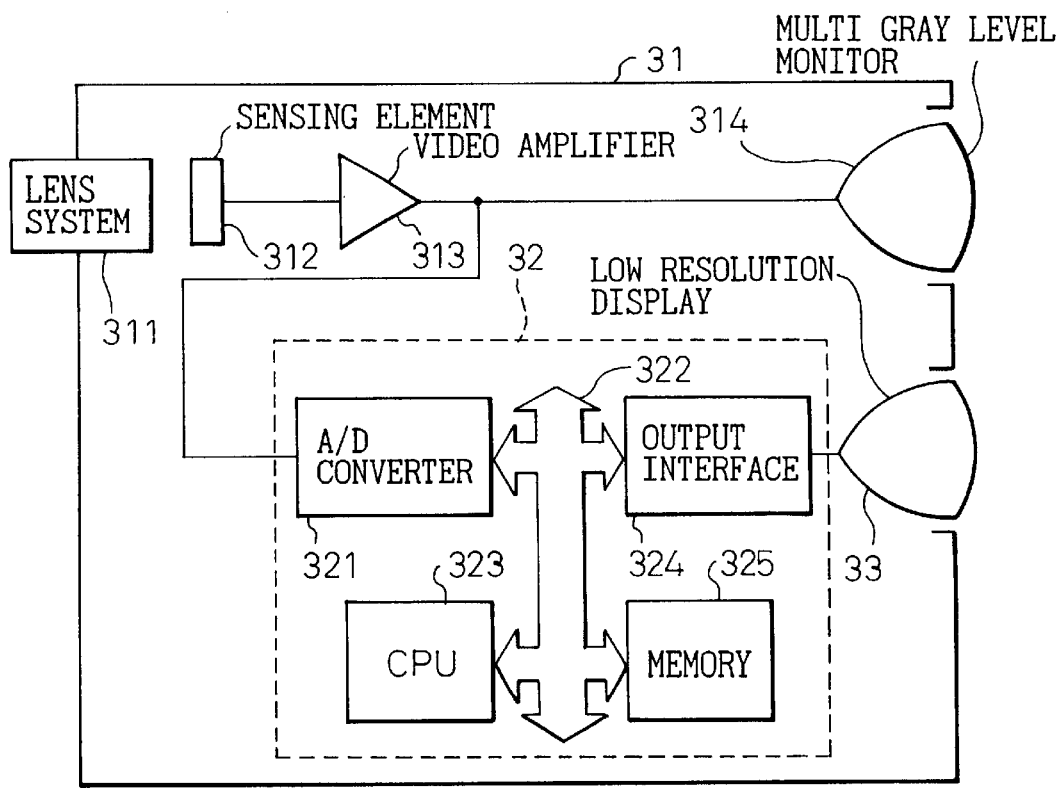

Note, the apparatus according to the present invention can be installed in the infrared camera as shown in FIG. 3(B). In this case, a multi gray level monitor 314 may be deleted.

An infrared image passing through a lens unit 311 is converted to an electric signal by a sensing element 312, and the electric signal is amplified by a video amplifier 313. The amplified video signal is supplied not only to the multi gray level monitor 314, but also to an A/D converter 321. The A/D converter 321 has a 12 bit resolution enabled to handle an image with multi gray levels.

The digital video signal with multi gray levels outputted from the A/D converter 321 is stored in the memory 325, and is converted as explained before. The converted video signal is supplied to the low resolution display 34.

When the microcomputer 32 is installed in the infrared camera, it is desirable not to need to load the converting program from the external storage in order to prevent the camera from being large and/or expensive. Therefore, in this case, the converting program is stored in the memory 325 from the beginning.

Note, a digital signal processor (DSP) can be used instead of the CPU 323 by modifying the construction accordingly. This invention can be realized not only by a processor and a program, but also by a hard wired circuit made from filter circuits, edge extracting circuits, etc.

Figure 4:
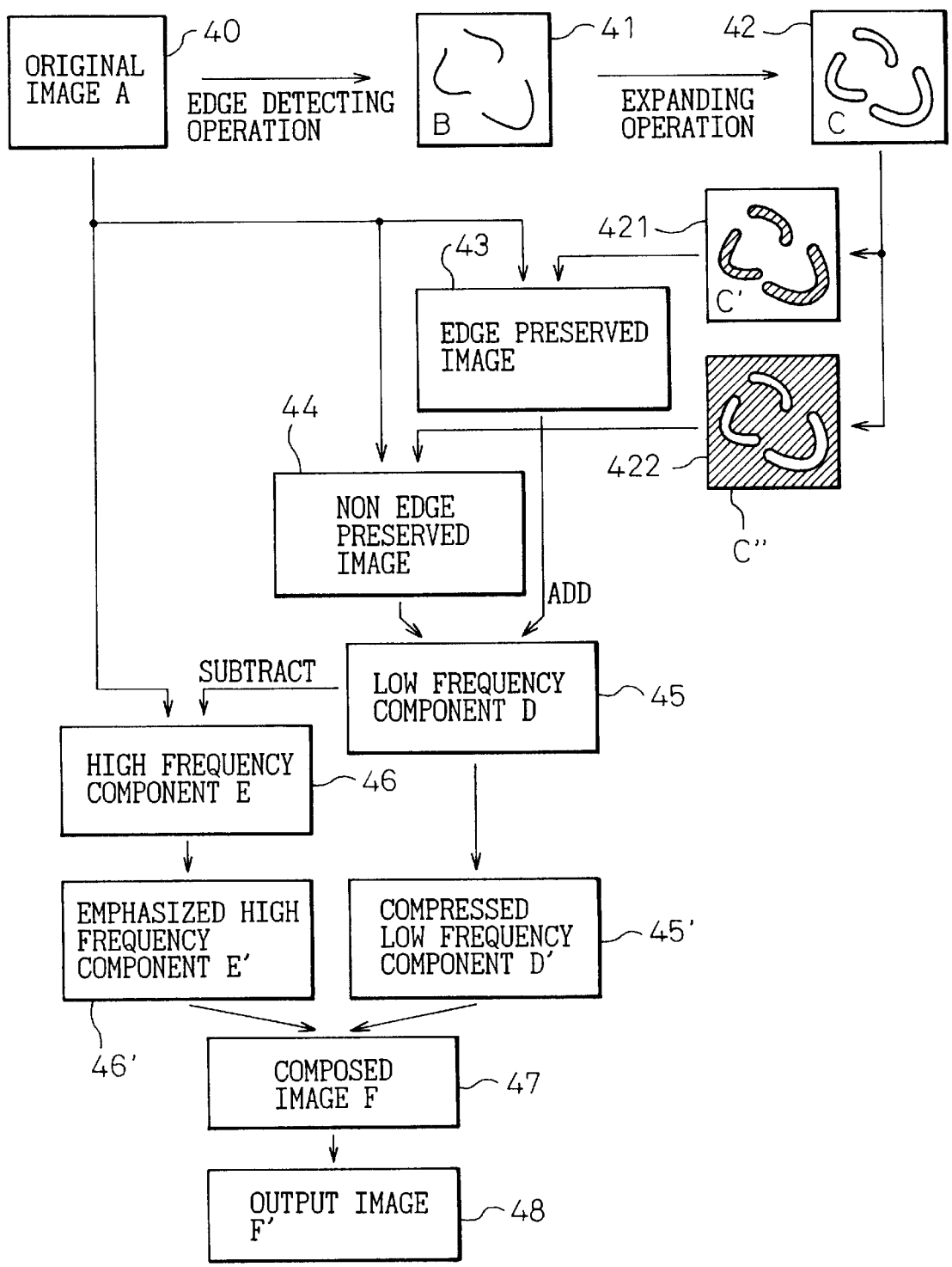
FIG. 4 is a flowchart to explain steps for converting gray levels of an image.

FIG. 4 is a flowchart to explain a gray level converting method according to the present invention. An edge detecting operation is performed on an original image (A) with M gray levels 40 in order to emphasize portions which have larger gray level difference between neighbouring pixels than a fixed threshold and to obtain an edge detected image 41.

At the next step, a mask pattern 42 is made using an expanding operation. A positive mask 421 which can pass only pixels near an edge (for example, 3 pixels located on both sides of an edge) and an reversed mask 422 which can pass other pixels are made from the mask pattern 42.

An edge preserved image 43 is obtained by performing the operation which can not only reject noise but also preserve edges by masking the original image (A) 40 with the positive mask 421. An edge nonpreserved image 44 is obtained from performing an operation which can reject noise but cannot keep edge by masking the original image (A) 40 with the reversed mask 422. Then a low frequency component (D) 45 is obtained by adding the edge preserved image 43 and the non-edge preserved image 44.

Note, it is possible to determine a noise rejecting operation to be applied by evaluating an edge strength every pixel without using the positive mask 421 and the reversed mask 422.

The compressed low frequency image 45' is obtained by performing a gray level compressing operation which compresses gray levels of the low frequency component (D) 45. After a high frequency component 46 is obtained by subtracting the low frequency component (D) 45 from the original image (A) 40, the emphasized high frequency component 46' is obtained by emphasizing the gray level.

The composed image 47 is obtained by composing the gray level compressed image 45' with the emphasized high-frequency component 46', and an output image 48 is obtained by recompressing gray levels of the composed image 47 to N levels.

That is, this invention is features changing a filtering characteristic in accordance with edge strength of the original image.

Figure 5:
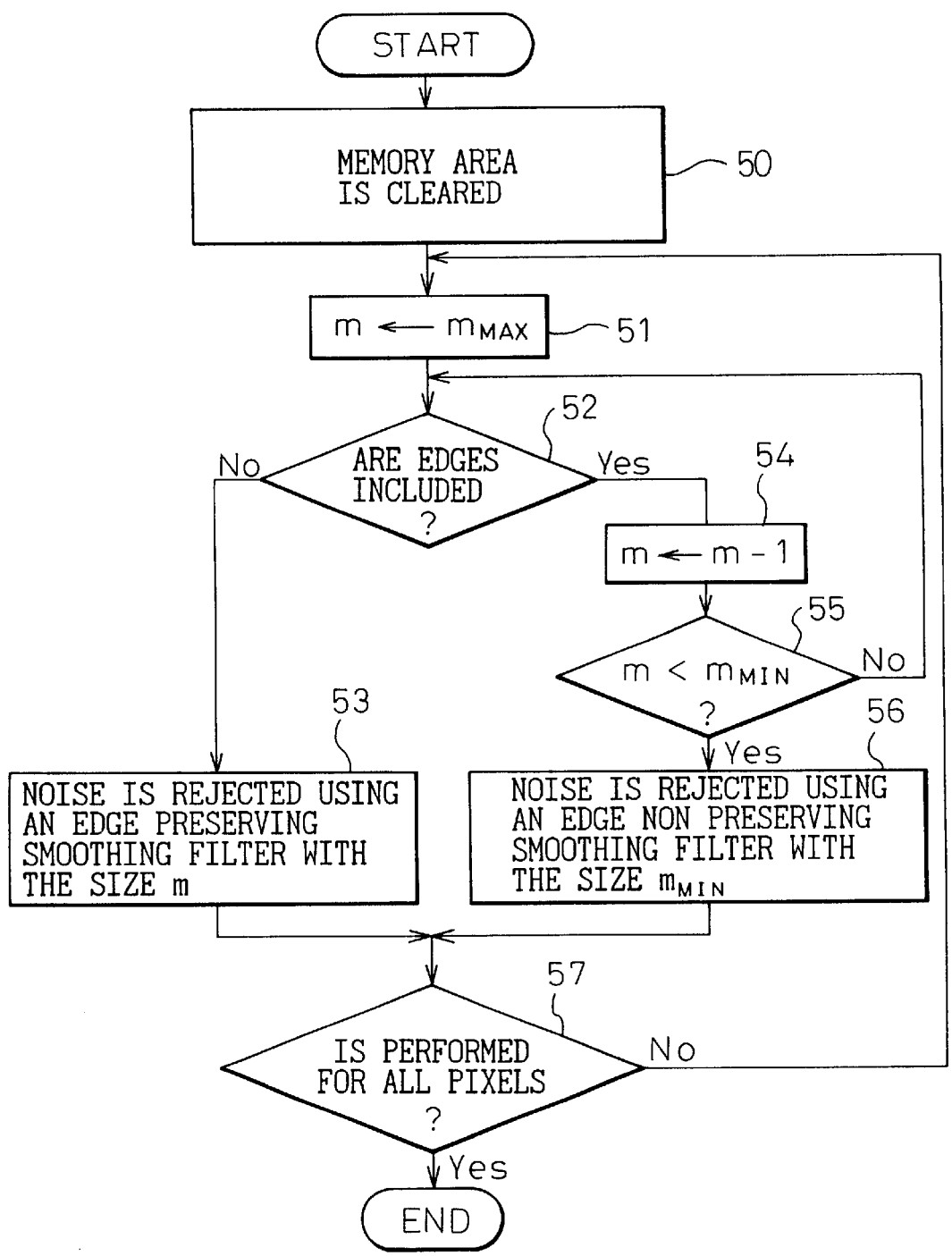
FIG. 5 is a flowchart of a first low frequency component extracting routine.

FIG. 5 is a flowchart of a first low frequency component extracting routine. A memory area for storing the edge detected image 41 is cleared at step 50.

The size of a smoothing filter is set to a fixed maximum size $m_{MAX}$ (for example, 25×25) at step 51, and a horizontal scan from the left corner at the top of the original image to its right corner at the bottom is begun.

It is determined whether or not edges are included within the area which is converted by the filter at step 52, and when the determination at step 52 is negative, random noise in the original image is rejected using an edge preserving smoothing filter (for example, a mean value filter or a Gaussian filter) with the size "m".

When the determination at step 52 is affirmative, the size of the filter "m" is decremented at step 53. Next, it is determined whether or not the size of the filter is equal to a fixed minimum $m_{MIN}$ (for example, 3) at step 55, and when the determination at step 55 is negative, the control returns to step 52 to repeat the same process.

When the determination at step 55 is affirmative, that is, when edges are included though the size of the filter is the minimum, a smoothing operation is performed using an edge nonpreserving smoothing filter with the size $m_{MIN}$ (for example, a median filter).

If is determined whether or not smoothing is performed for all pixels of the original image at step 57, and when the determination at step 57 is negative, the control returns to step 51 to repeat the same process. Conversely, the routine is terminated as the low frequency component (D) has already obtained when the determination at step 57 is affirmative.

Figure 6:
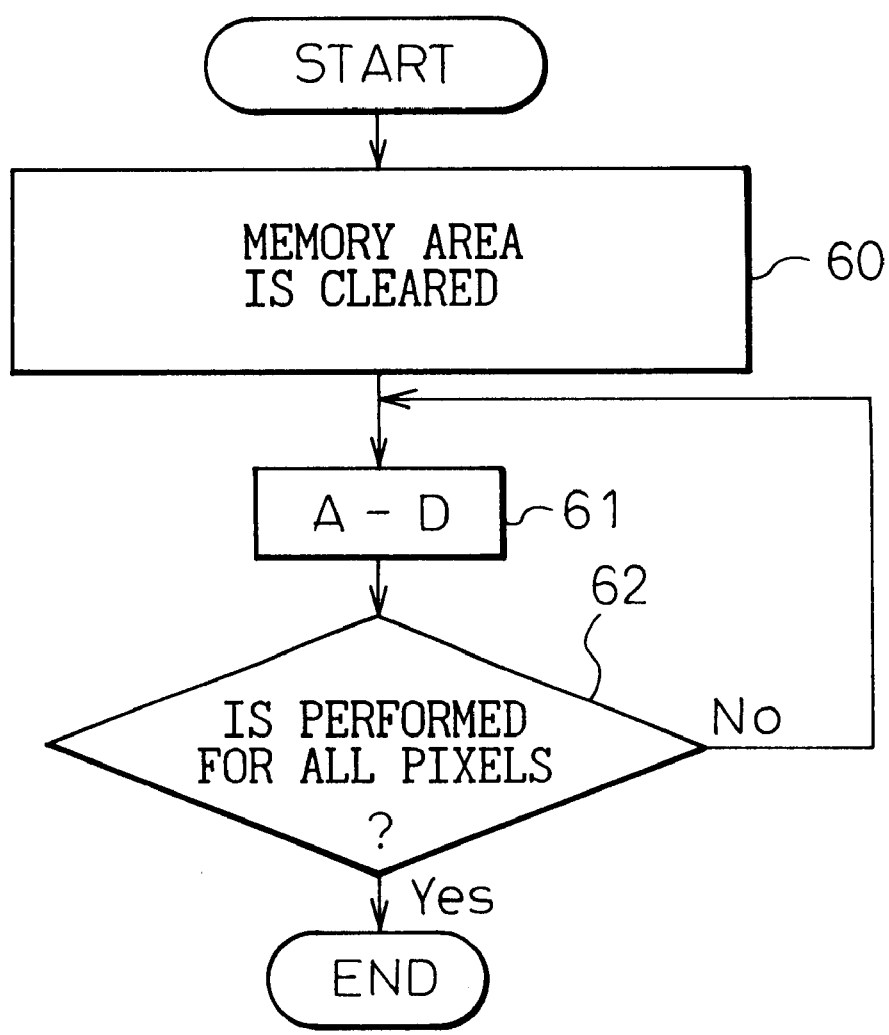
FIG. 6 is a flowchart of a high frequency component extraction routine.

FIG. 6 is a flowchart of a high frequency component extracting routine to extract the high frequency component (E) which represents local gradation of the original image. A memory area for storing the high-frequency component (E) in the memory 325 is cleared at step 60, and the high frequency component (E) is obtained by subtracting the low frequency component (D) from the original image (A) for every pixel.

It is determined whether or not the high frequency component (E) has already obtained at step 62. This process is repeated until the subtraction is performed for all pixels, and then the routine is terminated.

Figure 7:
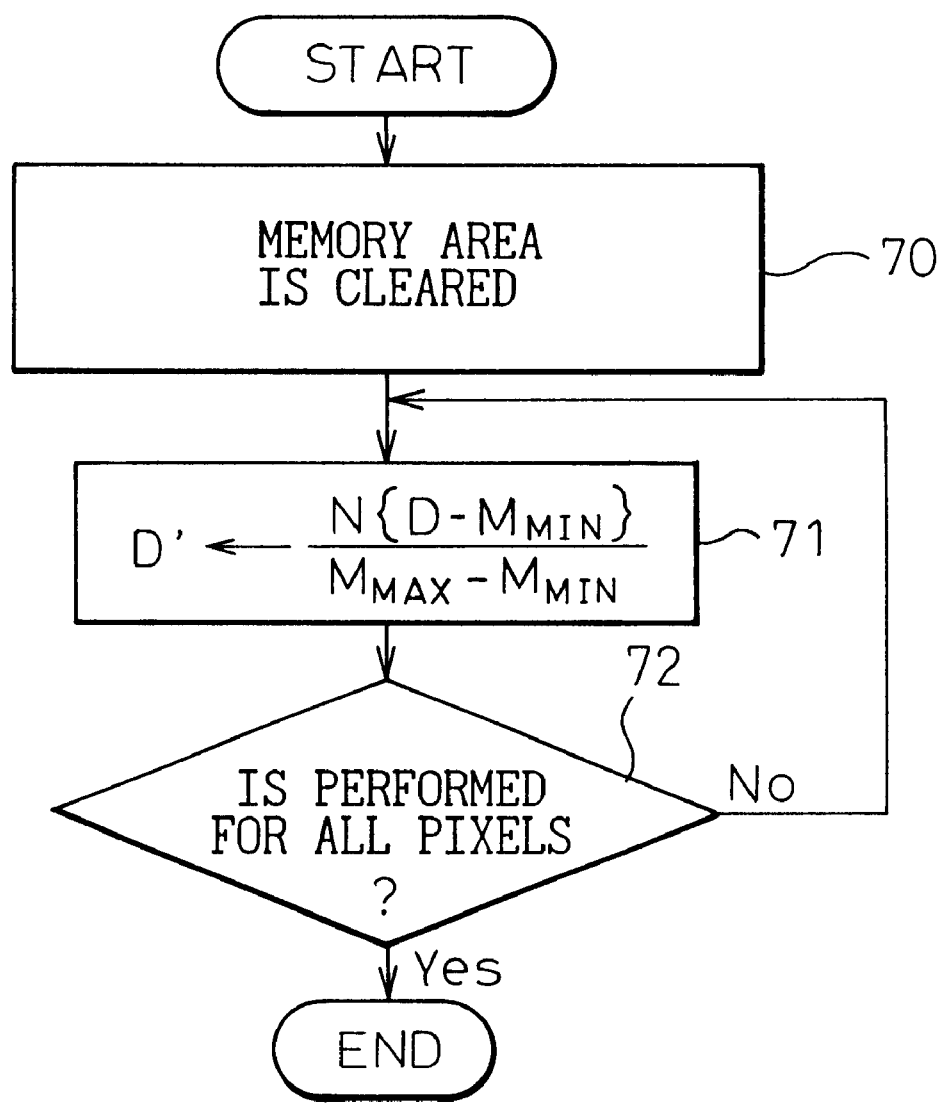
FIG. 7 is a flowchart of a low frequency gray levels compressing routine.

FIG. 7 is a flowchart of a gray level converting routine to convert gray levels of the low frequency component (D) from M levels to N levels (M>N). A memory area for storing the compressed low frequency component (D') in the memory 325 is cleared at step 70.

The gray levels of every pixel of the low frequency component (D) is compressed using the following equation, and the compressed low frequency component (D') is stored.

$$D'(i,j)=[N*\{D(i,j)-M_{MIN}\}]/\{M_{MAX}-M_{MIN}\}$$

Where $M_{MAX}$ is a maximum intensity of the original image, and $M_{MAX} \leq M$ $M_{MIN}$ is a minimum intensity of the original image, and $M_{MIN} \leq M_{MAX}$ It is determined whether or not the low frequency component (D) has already compressed at step 72. This process is repeated until the compression is performed for all pixels, and then the routine is terminated.

Figure 8:
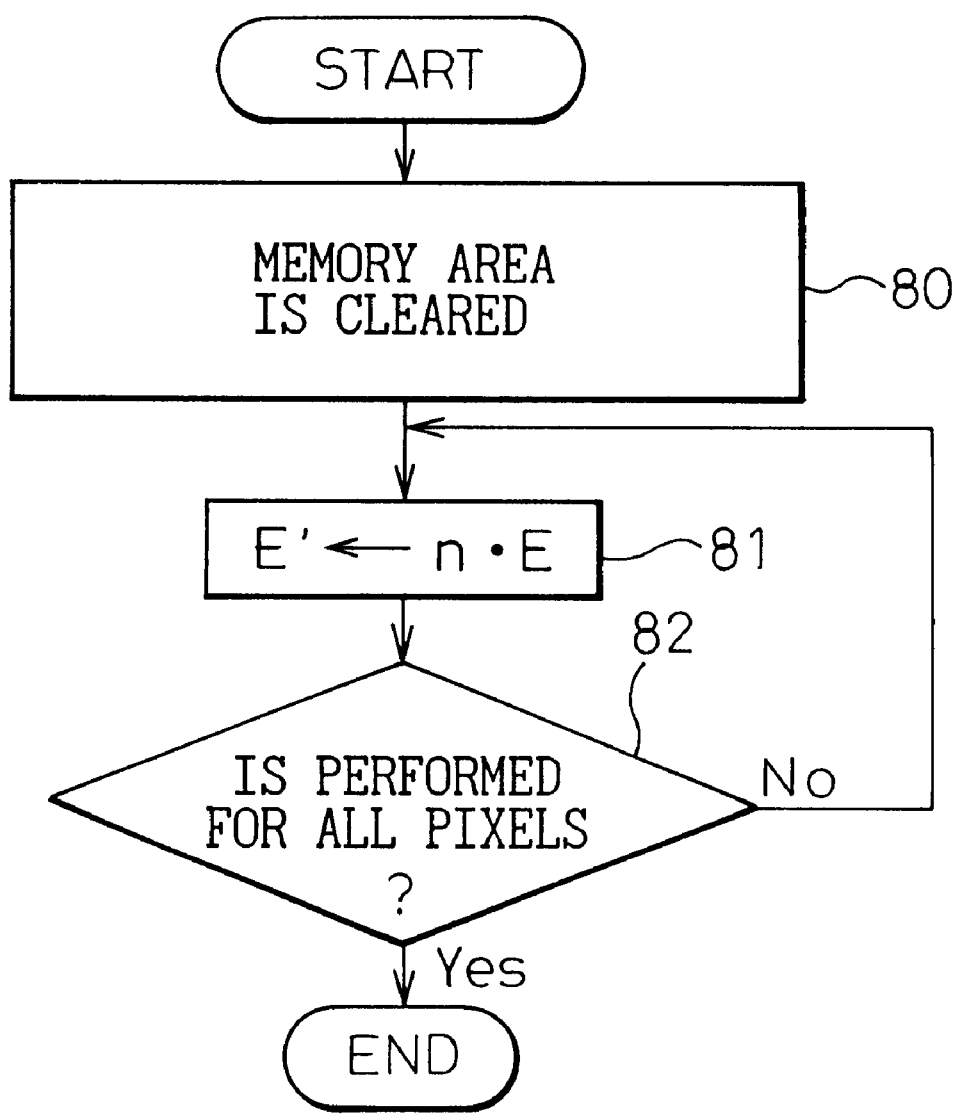
FIG. 8 is a flowchart of a high frequency component emphasizing routine.

FIG. 8 is a flowchart of a high frequency component emphasizing routine to emphasize the gray levels of pixels of the high-frequency component (E). A memory area for storing the emphasized high-frequency component (E') is cleared at step 80.

At step 81, each pixel of the high-frequency component (E) is emphasized, for example, using the following equation and is stored in the memory area for storing the emphasized high-frequency component (E').

$$E'(i,j)=n \cdot E(i,j) \text{ (for example n=2)}$$

It is determined whether or not the emphasizing operation is performed for all pixels of the high frequency component (E) at step 82. This routine is terminated after the above process is repeated until the emphasizing operation is performed for all pixels.

Figure 9:
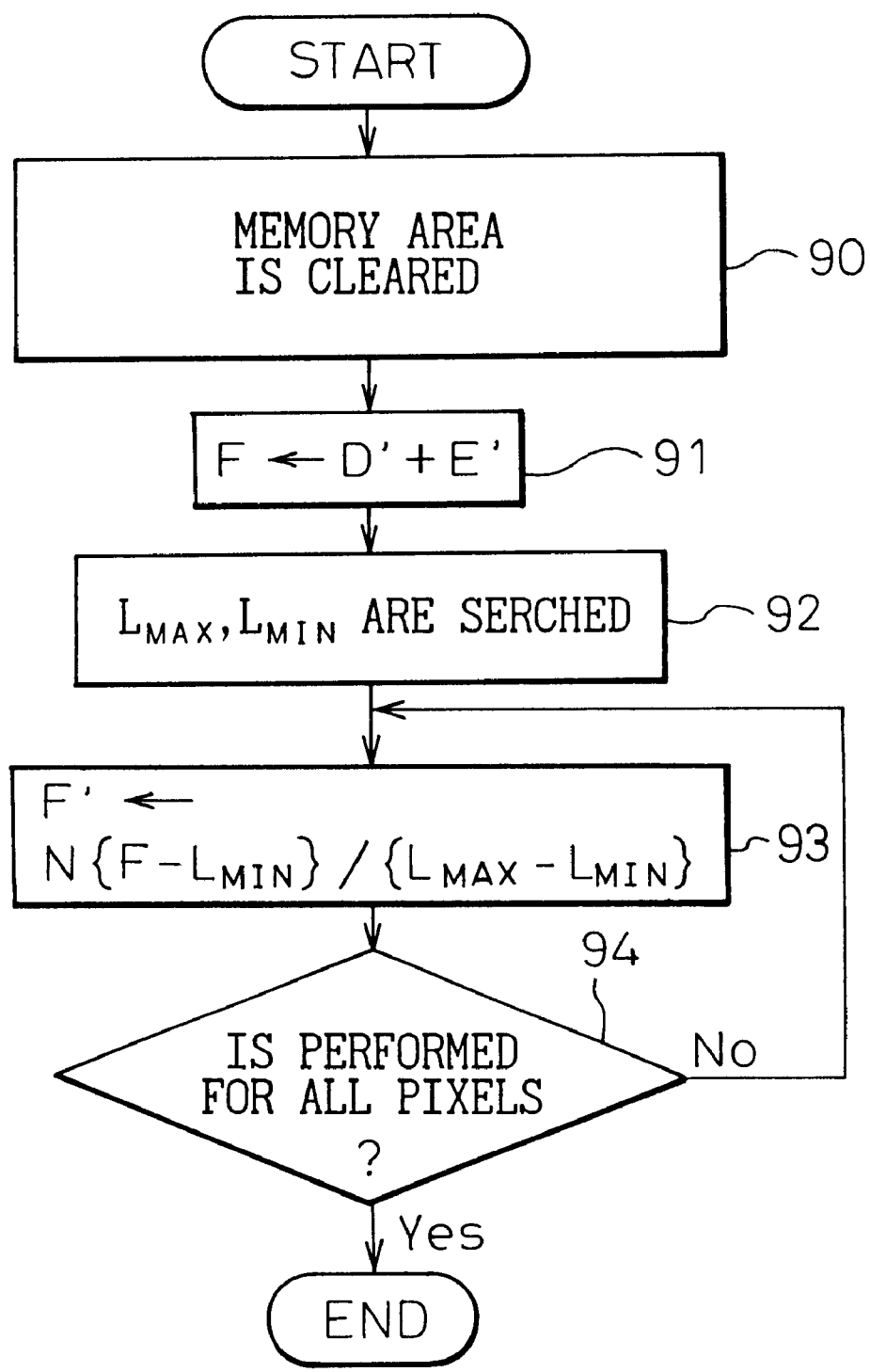
FIG. 9 is a flowchart of a composing and recompressing routine.

FIG. 9 is a flowchart of a combining and reconverting routine for obtaining the output image (F'). Memory areas for storing the composed image (F) and the output image (F') in the memory 325 are cleared at step 90.

The composed image (F) is obtained by adding the compressed low frequency component (D') and the emphasized high-frequency component (E') for every pixel of these image at step 91, and the maximum intensity $L_{MAX}$ and the minimum intensity $L_{MIN}$ Of the composed image (F) are searched at step 92. And the output image (F') is obtained by recompressing for every pixel of the composed image (F) using the following equation.

$$F'(i,j)=[N*\{F(i,j)-L_{MIN}\}]/\{L_{MAX}-L_{MIN}\}$$

It is determined whether or not the combining and recompressing operation is performed for all pixels of the composed image (F) at step 94. This routine is terminated after the above process is repeated until the combining and recompressing operation is performed for all pixels.

The clear image with fine gradation around edges can be displayed when the output image (F') is outputted to the display unit 33 though the output interface 324.

According to the above-mentioned first gray level converting method, it is not avoidable to increase amount of the process because the size of the smoothing filter is decided after it is determined whether or not an edge is contained within the filter.

The second gray level converting method is to solve the above-mentioned problem, and it can delete the determination of the filter size by previously making a mask.

Figure 10:
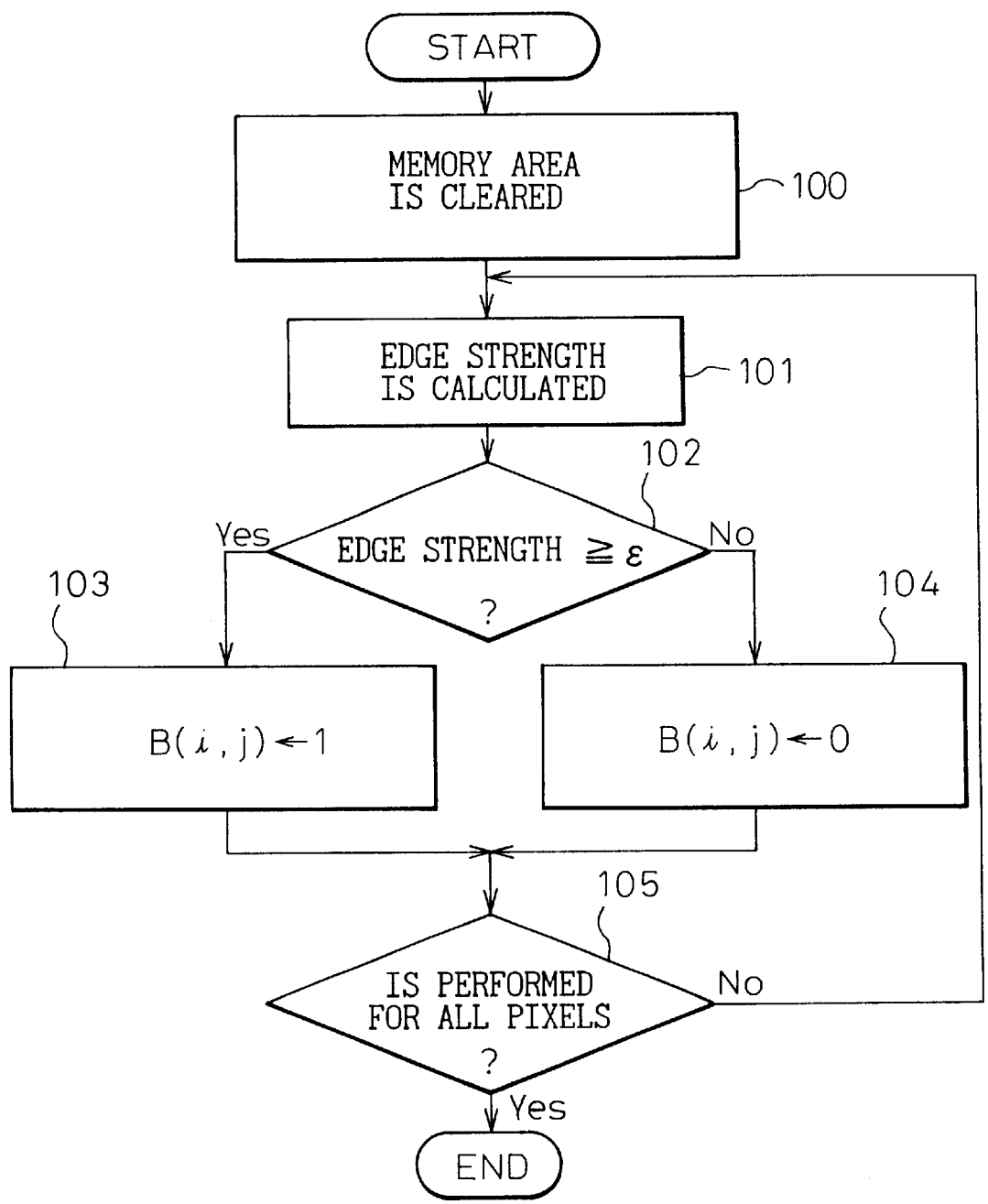
FIG. 10 is a flowchart of an edge emphasizing routine.

FIG. 10 a flowchart of an edge emphasizing routine to obtain an edge emphasized image (B) for making a mask, and a memory area for storing the edge emphasized image (B) in the memory 325 is cleared at step 100.

A horizontal scan from the left corner at the top of the original image to its right corner at the bottom for the original image (A) is begun, and an edge strength of each pixel of the original image (A) is calculated at step 101.

Known methods can be applied for calculating the edge strength, and, for example, the edge strength ES(i,j) for a pixel A(i,j) of the original image (A) is defined as follows when a Laplacian method is applied.

ES(i,j)

=[f(i,j+1)-f(i,j)]-[f(i,j)-f(i,j-1)]

+[f(i+1,j)-f(i,j)]-[f(i,j)-f(i-1,j)]

f(i,j+1)+f(i,j-1)+f(i+1,j)+f(i-1,j)

-4f(i,j)

Where f(i,j) denotes the intensity of the pixel A(i,j)

It is determined whether or not the edge strength ES is larger than or equal to a fixed threshold $\epsilon$, and a value of a pixel B(i,j) is set to "1" at step 103 when the ES is larger than or equal to $\epsilon$. Conversely, a value of a pixel B(i,j) is set to "0" at step 104 when the ES is smaller than $\epsilon$.

It is determined whether or not the edge strengthening operation is performed for all edges of the original image (A) at step 105, and the control returns to step 101 when the operation is not performed for all edges. Conversely, the routine is terminated when the operation has been performed for all edges.

Figure 11:
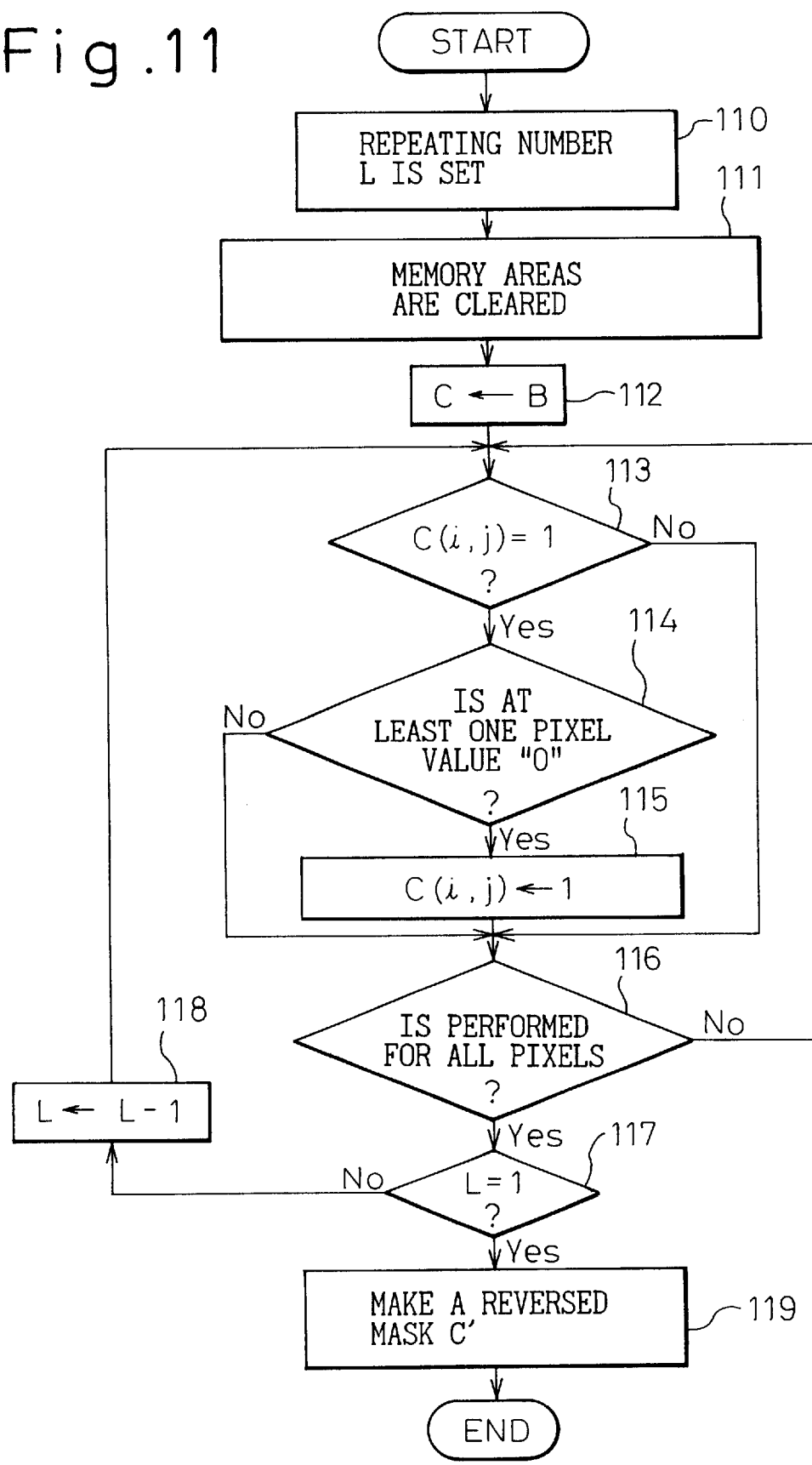
FIG. 11 is a flowchart of an edge elongating routine.

FIG. 11 is a flowchart of an edge elongating routine to make the mask image (C) from the edge emphasized image (B). The repeating number L which is defined as the repeating number for elongating operations is set to a fixed positive integer at step 110, and memory areas for storing the positive mask image (C) and the reversed mask image (C') in the memory 325 are cleared at step 111.

After the positive mask image (C) is copied from the edge emphasized image (B) at step 112, a horizontal scan from the left corner of the top of the mask image (C) to its right corner of the bottom is begun, and it is determined whether or not the value of a pixel C(i,j) is "1".

When the value of the pixel C(i,j) is "1", it is determined whether or not at least one pixel value of the pixel within the 8-neighbours of the pixel C(i,j) is "0" at step 114. When some pixels with the value "0" exist, the control proceeds to step 116 after an elongating operation which changes the value of the pixels from "0" to "1" is performed. Note, when the determination at step 113 is negative, or when the determination at step 114 is negative, the control directly proceeds to step 116.

Figure 12:
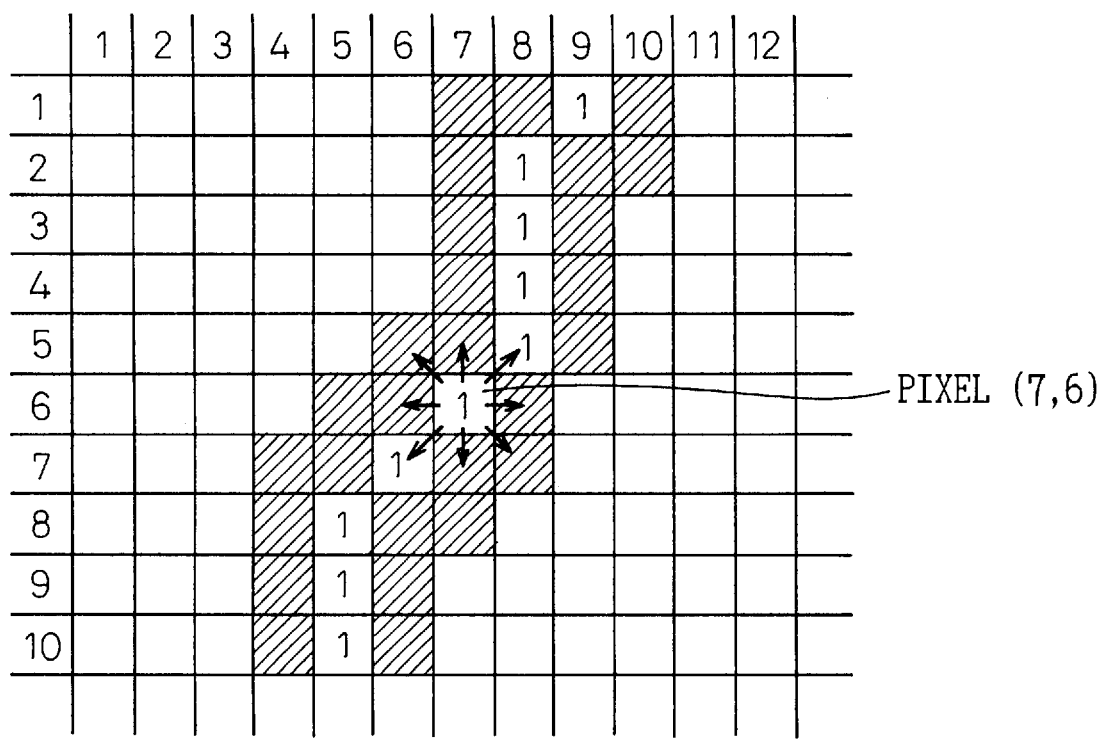
FIG. 12 is a diagram to explain an edge elongation.

FIG. 12 is a drawing to explain the edge elongating operation, where "1" means that the pixel value originally is "1" and shadowed pixels means pixels, the value thereof is replaced to "1" by the elongating operation.

For example, the eight-neighbours of the pixel (7,6) are (6,5), (7,5), (8,5), (6,6), (8,6), (6,7), (7,7), and (8,7), and the values of six pixels except the pixels of (8,5) and (6,7) the value thereof originally ate "1", are replaced from "0" to "1" to increase the edge width from one pixel to three pixels.

It is determined whether or not the operation has been performed for all pixels at step 116, and when it is determined that the operation is not completed, the control returns to step 113 to repeat the operation. Conversely, when the operation is completed, it is determined whether or not the repeating number L is "1" at step 117. When L is not "1", the control returns to step 113 after decrementing the repeating number L at step 118.

When L is "1", the routine is terminated after the pixel values of (C) are reversed to obtain the reversed mask image (C') at step 119.

Note, when the repeating number L is set to "1", a width of an edge in the original image is elongated from one pixel to three pixels. When L is set to "2", a width of an edge in the original image is elongated from one pixel to five pixels.

Figure 13:
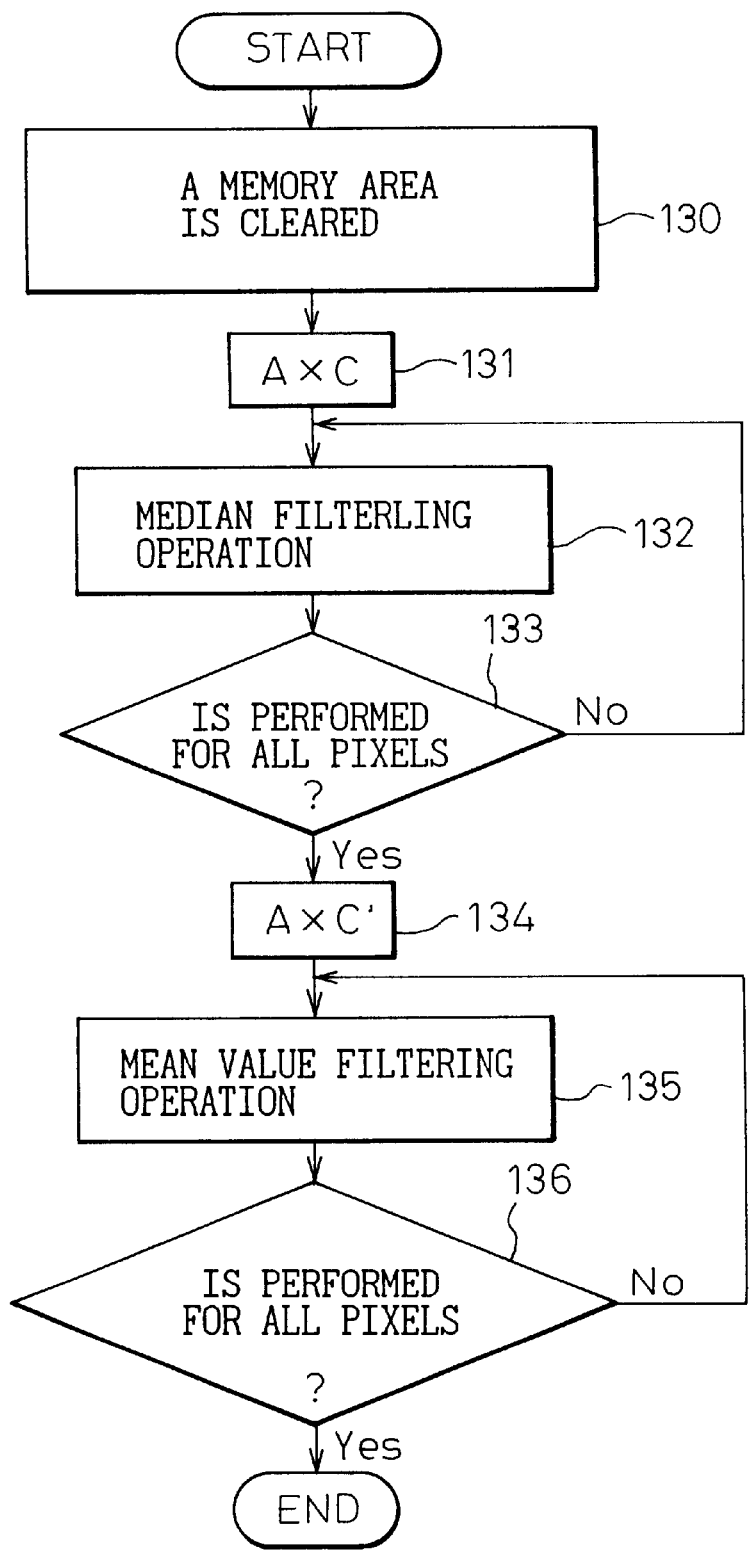
FIG. 13 is a flowchart of a second low-frequency component extracting routine.

FIG. 13 is a flowchart of a second low-frequency component extracting routine. A memory area for storing the edge emphasizing image is cleared at step 130.

At step 131, pixels neighbouring edges are extracted from the original image by masking the original image (A) with the positive mask image (C), that is, by calculating [A×C]. At step 132, the edge preserving smoothing operation is performed on pixels neighbouring edges, that is, on pixels which do not have the values "0", and the result is stored in the low frequency component (D).

Known filters can be applied for the edge preserving smoothing operation, and preferably the median filter is applied.

The median filter determines the median of the densities of pixels which exist within the area extracted by the positive mask image (C) as the pixel value of the center pixel. For example, 9 pixels exist within 3×3 area when L is set to "1", and the median of these 9 pixels is determined as the pixel value of the center pixel. Therefore, the larger the size of the median filter is (the size is "3" when L is set to "1".), the more unclear an edge becomes and the longer the required processing time becomes. Preferably the repeating number L is set as small as possible to make the size of the median filter small.

It is determined whether or not the operation with the median filter is performed for all pixels of the mask image (C) at step 133. When the operation is not completed, the control returns to step 132 to repeat the operation. Conversely, when the operation is completed, the control proceeds to step 134.

At step 134, pixels except pixels neighbouring edges are extracted by masking the original image with the reversed mask image (C'), that is, by calculating [A×C']. The non-edge preserving smoothing operation is performed for the pixels except pixels neighbouring edges to securely reject noise, and the result is stored in the low frequency component (D).

Known filters can be applied for the non-edge-preserving smoothing operation, and preferably the mean value filter or the Gaussian filter is applied. Note, because it is not necessary to preserve edges for the pixels except pixels neighbouring edges, the size of the filter preferably is set as large as possible.

It is determined whether or not the operation has been performed for all pixels of the reversed mask image (C') at step 136. When the operation is not completed, the control returns to step 135 to repeat the operation. Conversely, when the operation has been completed, the routine is terminated.

That is, the second gray level converting method can delete the determination of the applied smoothing method for every pixel because the positive mask for extracting the pixels neighbouring the edges and the reversed mask for extracting the pixels except the pixels neighbouring the edges are made, and the edge preserving smoothing operation is performed for the pixels extracted by the positive mask and the non edge preserving smoothing operation is performed for the pixels except the pixels neighbouring the edges.

Note, the processing after extracting the low-frequency component is same as the first gray level conversion method.

Figure 14:
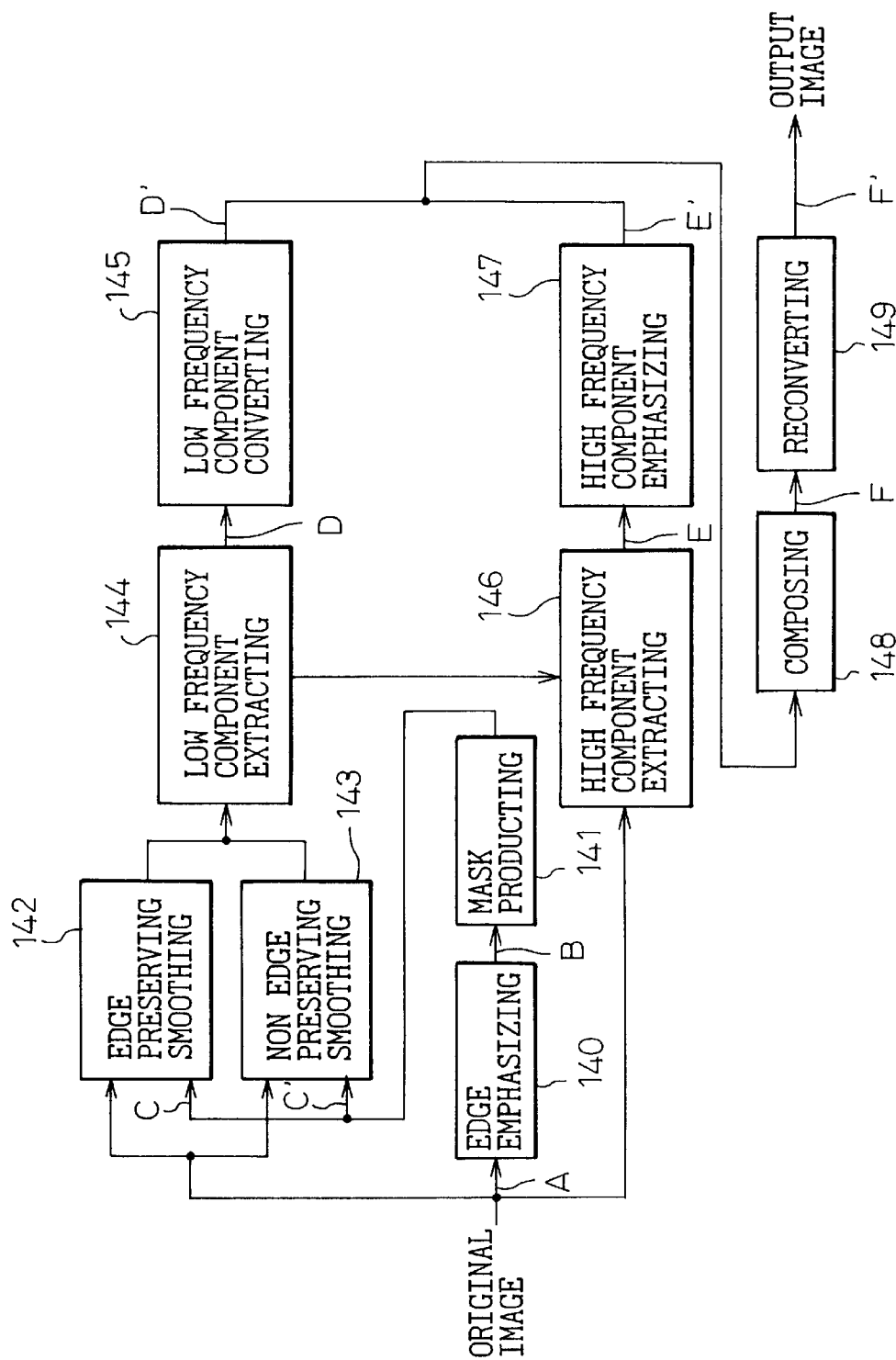
FIG. 14 is a diagram to explain a second low-frequency component extracting method.

FIG. 14 is a functional diagram to explain the second gray level converting method. The edge emphasized image (B) is produced from the original image by performing the edge emphasizing operation (FIG. 10) in block 140. The positive mask image (C) and the reversed mask (C') are obtained from the elongated image (B) at block 141.

After the low frequency component (D) is obtained at block 144 by performing the edge reserving smoothing operation for the original image (A) masked with the positive mask image (C) at block 142 and performing the non edge reserving smoothing operation for the original image masked by the reversed mask (C') at block 143, the compressing operation is performed to obtain the compressed low frequency component (D') at block 145.

After the high frequency component (E) is obtained by subtracting the low frequency component (D) from the original image (A) at block 146 (FIG. 6), the emphasized high frequency component (E') is obtained by emphasizing the high frequency component (E).

After the composed image (F) is composed by adding the compressed low frequency component (D') and the emphasized high frequency component (E') at block 148, the output image (F') is obtained by performing the reconverting operation.

The second gray level conversion method is a little complex, because two filters are necessary for smoothing, that is, one is for the edge reserving smoothing filter for pixels neighbouring edges and the other is for no-edge-preserving smoothing filter for pixels except pixels neighbouring edges.

The third gray level converting method is to solve the above-mentioned problem, and simplifies the converting program.

Figure 15:
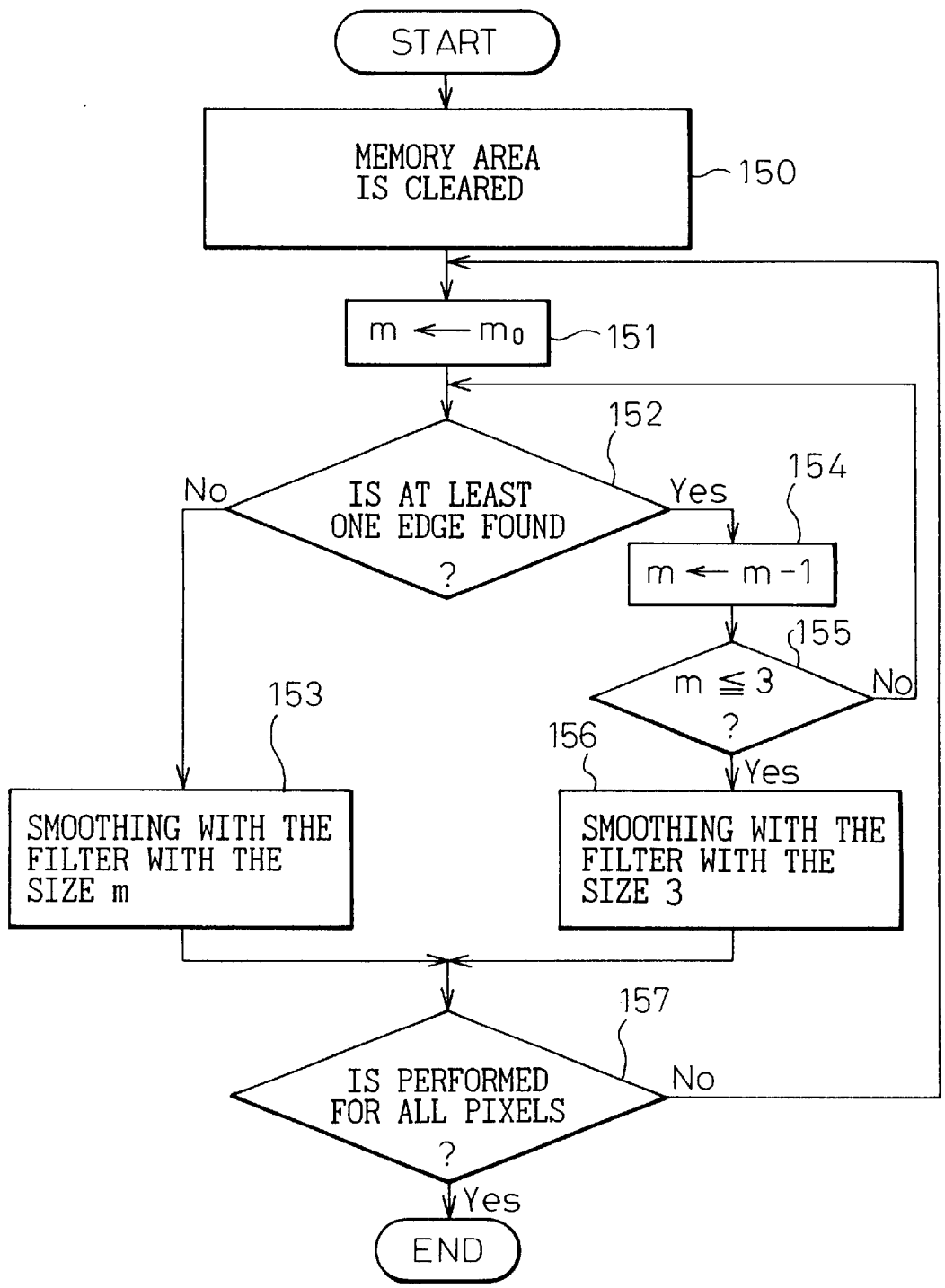
FIG. 15 is a flowchart of a third low-frequency component extracting routine.

FIG. 15 is a flowchart of a third low-frequency component extracting routine to obtain the low frequency component, a memory area in the memory 325 for storing the low frequency component is cleared at step 150.

After the size of a filter for smoothing (for example, the mean value filter or the Gaussian filter) m is determined as a fixed positive integer $m_0$ (for example 25) at step 151, a horizontal scan from the left corner of the top of the original image (A) to its right corner of the bottom is begun.

It is determined whether or not at least one edge is found within the filter with the size mo at step 152, and when at least one edge is not found, smoothing is performed using the filter with the size $m_0$, and the result is stored in the low-frequency component (D).

When at least one edge is found at step 152, the size of the filter m is decremented at step 154. It is determined whether or not the size of the filter reaches "3" at step 155, and when it does not reach "3", the control returns to step 152 to repeat the above process until any edges are not found in the filter or the size of the filter reaches "3".

When the determination at step 155 is affirmative, the smoothed image using the filter with the size "3" is stored as the low frequency component (D). It is determined whether or not the operation is performed for all pixels at step 157. When the operation is not completed, the control returns to step 151, and when the operation is completed, this routine is terminated.

Figure 16:
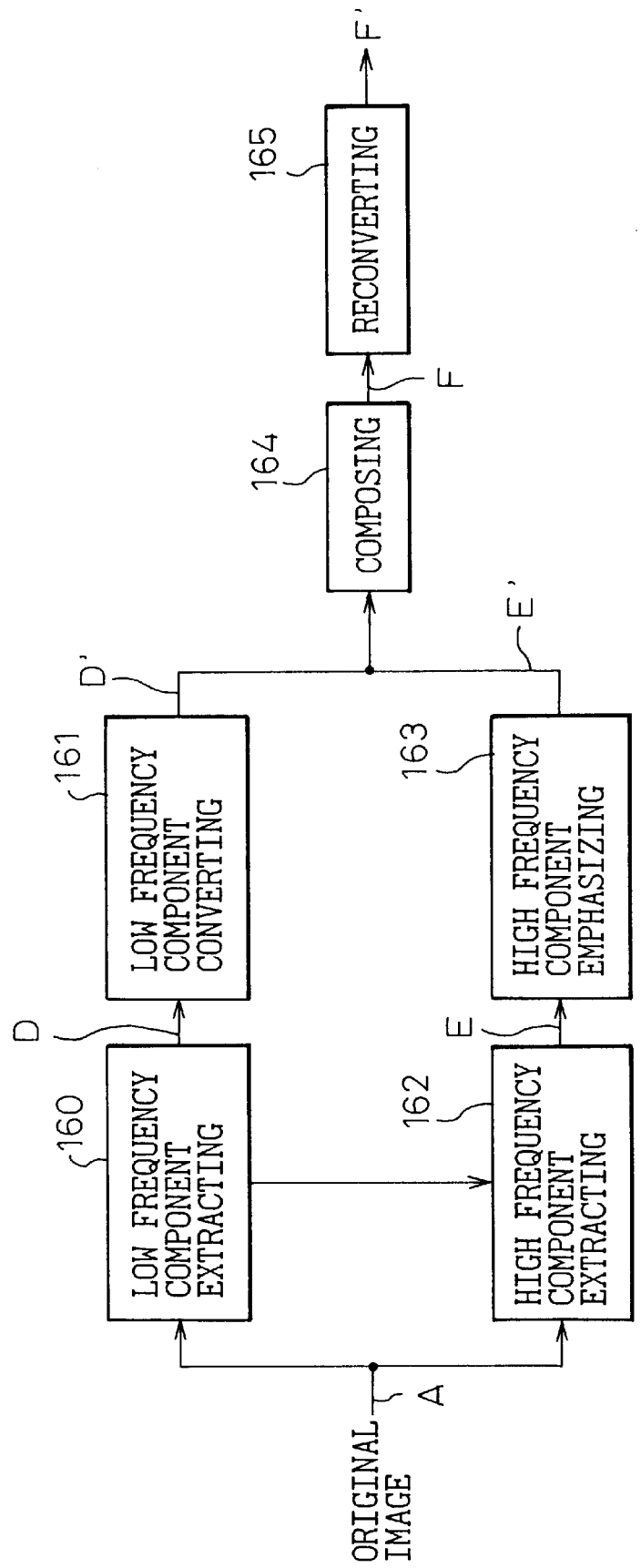
FIG. 16 is a diagram to explain a third low-frequency component extracting method.

FIG. 16 is a diagram to explain the third gray-level converting method. The low frequency component (D) is extracted by the third low frequency component extracting routine at block 160, and the process hereafter, that is, the gray level converting operation for the low frequency component (D) (block 161), the extracting operation of the high frequency component (E) (block 162), the emphasizing operation for the high frequency component (E) (block 163), the composing operation (block 164) and the reconverting operation (block 165) are same as the first gray level converting method.

The third gray level converting method requires large amount of processing because the size of the filter has to be determined for every pixel, though smoothing is performed using only one type of a filter.

The fourth gray level converting method uses the mask same as the second gray level converting method to solve the above-mentioned problem. At first, the elongated image (B) is obtained using the same method as the second method.

Figure 17:
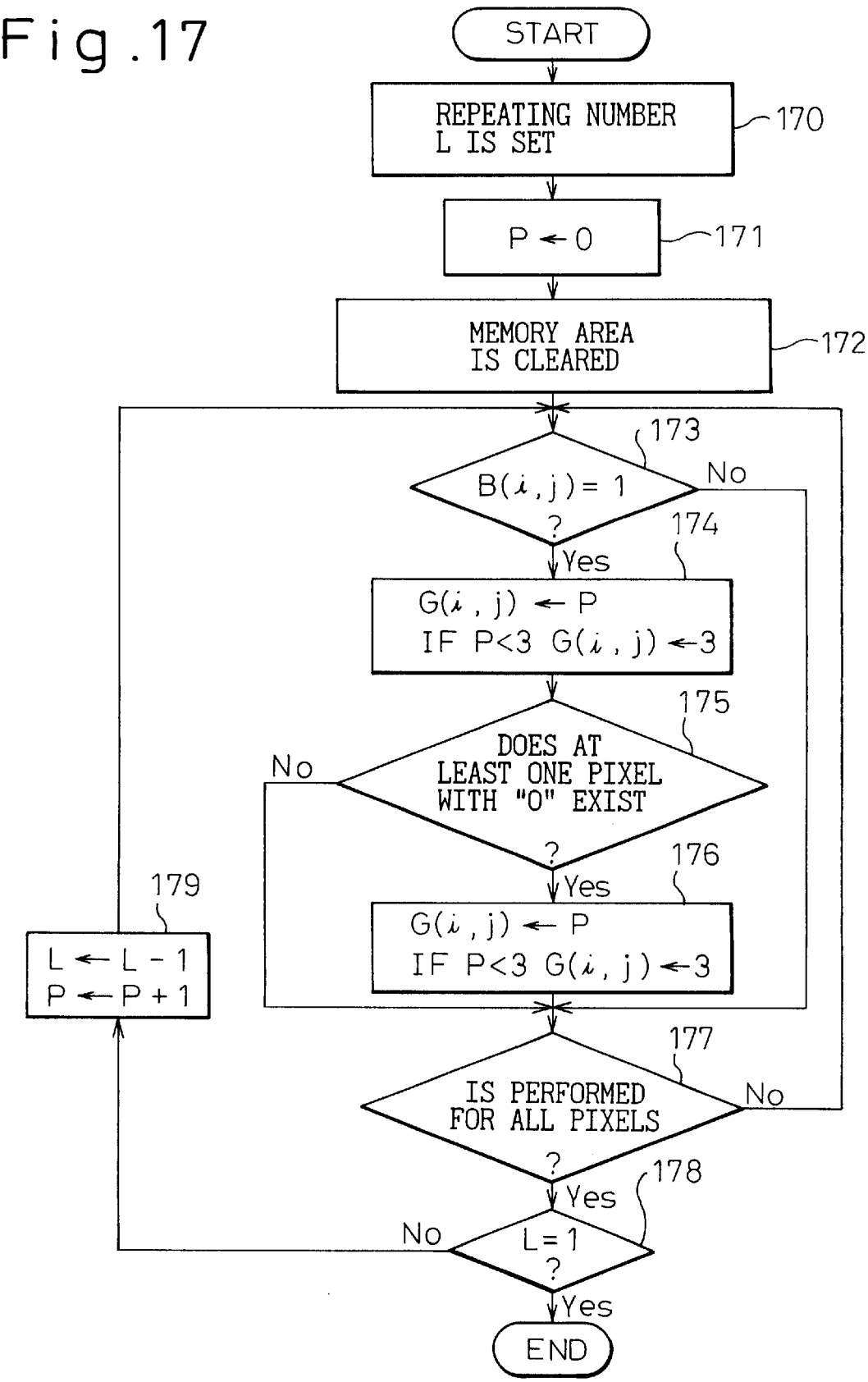
FIG. 17 is a flowchart of a second edge elongating routine.

FIG. 17 is a flowchart of the second edge elongating routine to make the second mask image (G) from the edge emphasizing image (B). The repeating number L is set to a fixed positive integer at step 170, and a mask value P is set to "0" at step 171. After a memory area in the memory 325 for storing the second mask image (G) is cleared at step 172, the horizontal scan from the left corner at the top to the right corner at the bottom is begun.

It is determined whether or not the value of B(i,j) in the edge emphasized image (B) is "1" at step 173. When the value is equal to "1", the value of a pixel G(i,j) of the second mask (G) is set to the mask value P. Note, the value is set to "3" when P is smaller than "3". This is to securely prevent some edges from being contained within the filter when performing the smoothing operation for pixels neighbouring the edges.

It is determined whether or not at least one pixel with the value "0" exists within 8-neighbours of the pixel B(i,j) at step 175. When the determination at step 175 is affirmative, the value is replaced by "P" at step 176. Note, the value is set to "3" when "P" is smaller than "3". This reason has already been explained. Note, when the determination at step 173 is negative or when the determination at step 175 is negative, the control directly proceeds to step 177.

It is determined whether or not the operation has been performed for all pixels at step 177. When the determination is negative, the control returns to step 173 to repeat the above process. Conversely, when the operation has been performed, it is determined whether or not the repeating number L is equal to "1" at step 178. When the determination at step 178 is negative, the control returns to step 173 after the repeating number L is decremented and the value P is incremented at step 179. Note, the routine is terminated when L is equal to "1".

Figure 18:
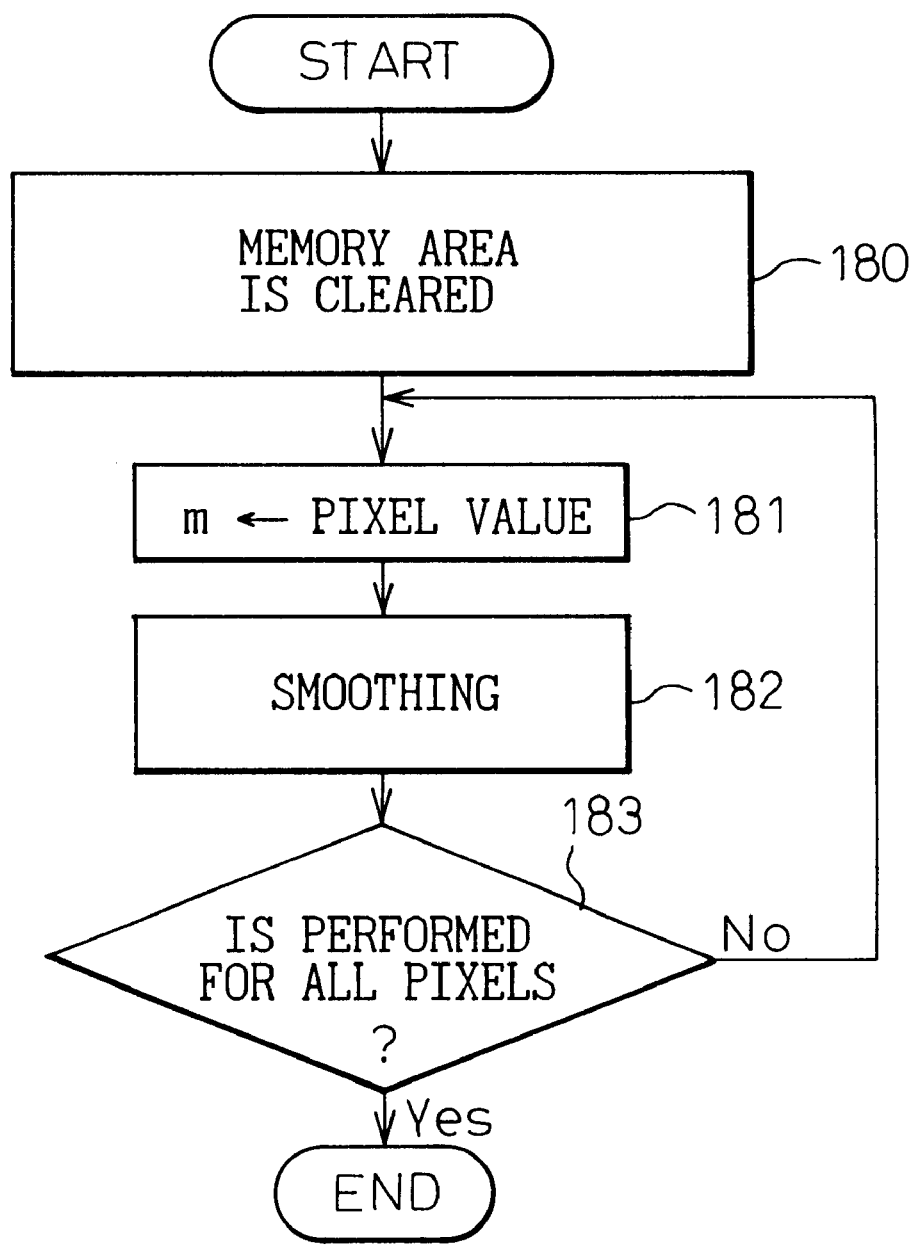
FIG. 18 is a diagram to explain a fourth low frequency component extracting method.

FIG. 18 is a flowchart of the fourth low frequency component extracting routine which is applied to the fourth gray level converting method. After a memory area in the memory 325 for storing the low frequency component (D) is cleared at step 180, a horizontal scan from the left corner at the top to the right corner at the bottom is begun.

The size of a filter for smoothing m is set to the pixel value at step 181, the filtering operation is performed using the filter, and the result is stored in the low frequency component (D) at step 182.

It is determined whether or not the operation has already been performed for all pixels at step 183, and when the operation is not completed, the control returns to step 181 to repeat the above processing. Conversely, when the operation is completed, the routine is terminated.

That is, the second mask image (G) which has "3" as the pixel value for the pixels neighbouring the edge and a fixed value larger than "3" (for example 25) as the pixel value for the pixels except pixels neighbouring the edge. Noise is rejected from the original image using the filter with the size defined by the mask image (G), and amount of processing can be decreased by omitting the process to determine the size of the filter for every pixel.

Figure 19:
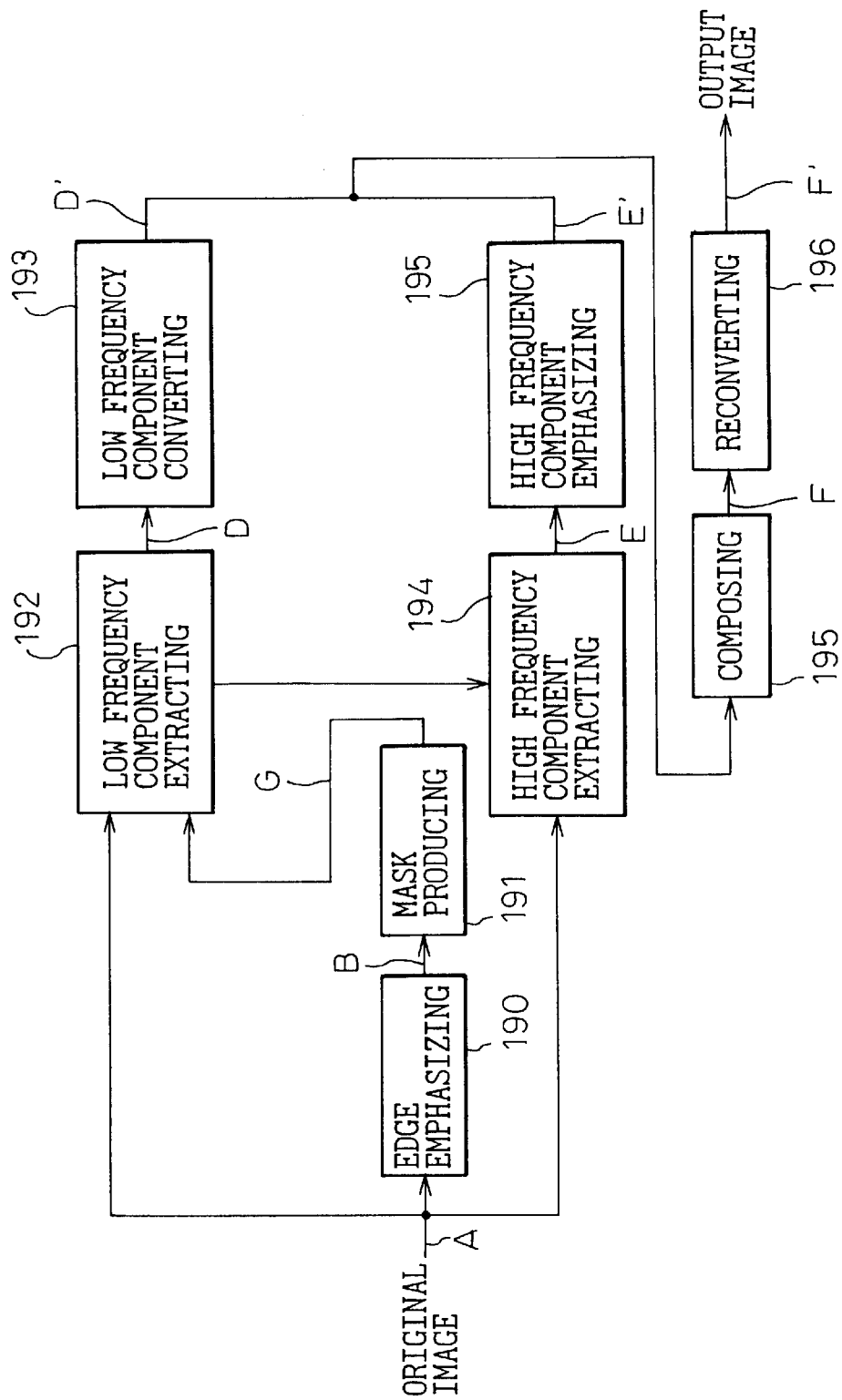
FIG. 19 is a diagram to explain a fourth low-frequency component extracting method.

FIG. 19 is a diagram to explain the fourth gray level converting method. After the edge emphasized image (B) is obtained from the original image (A) using the same procedure as the second gray level converting method at block 190, the second mask image (G) is obtained from the edge emphasized image (B) using the second elongating routine. The low frequency component (D) is obtained by the fourth low frequency extracting routine and the second mask image (F).

The following process, that is, the compressing operation of the low frequency component (D) (block 193), the extracting operation of the high-frequency component (E) (block 194), the composing operation (block 195), and the recompressing operation (block 196) are same as the second gray level converting method.

According to the fourth gray level converting method, the amount of calculation can be considerably decreased not only because it is not necessary to determine the size of the filter for every pixel, but also because it is not necessary to change the filter by using the mask image which has the size of the filter as the pixel value.

What is claimed is:

1. A gray level converting apparatus comprising:
    means for dividing an original image with multiple gray levels into a low frequency component which represents a broad gradation and a high frequency component which represents a local gradation;
    means for detecting an edge strength which is defined as the difference of the gray levels between neighboring pixels of the original image; and
    means for changing a dividing characteristic used in said dividing means in accordance with the edge strength determined by said edge strength detecting means.

2. The gray level converting apparatus of claim 1, wherein further comprising:
    means for compressing the gray levels of the low frequency component divided by said dividing means; and
    means for composing the compressed low frequency component compressed by said compressing means with the high frequency component divided by said dividing means.

3. The gray level converting apparatus of claim 1, wherein:
    said characteristic changing means changes a characteristic for extracting the low frequency component in accordance with the edge strength determined by said edge strength detecting means; and
    said dividing means further comprises:
        means for extracting the low frequency component from the original image using the low frequency component extracting characteristic changed by said characteristic changing means, and
        means for extracting the high frequency component in accordance with the original image and the low frequency component extracted by said low frequency component extracting means.

4. The gray level converting apparatus of claim 1, wherein said characteristic changing means further comprises:
    edge extracting means for extracting pixels which are contained within a fixed number of the pixels on both sides of the edges detected by said edge strength detecting means from the original image; and non-edge extracting means for extracting pixels excluding the pixels extracted by said edge extracting means, said dividing means extracting the low frequency component using an edge preserving smoothing operation for pixels extracted by said edge extracting means and using a non-edge preserving smoothing operation for pixels extracted by said non-edge extracting means.

5. The gray level converting apparatus of claim 4, wherein said low frequency component extracting means makes the size of a filter which is utilized for extracting the low frequency component smaller as the edge strength detected by said edge strength detecting means becomes larger.

6. The gray level converting apparatus of claim 1, wherein said characteristic changing means further comprises:

means for extracting pixels which are included within a fixed number of pixels on both sides of the edges detected by said edge strength detecting means; and means for extracting pixels excluding the pixels extracted said edge pixel extracting means, said dividing means extracting the low frequency component using a filter of a relatively smaller size for pixels extracted by said edge extracting means, and using a filter of a relatively larger size for pixels extracted by said non-edge extracting means.

7. An infrared camera, comprising:

means for taking an original image to generate a signal corresponding to the intensity of an original image with multiple gray levels;

means for dividing the signal generated by said original image taking means into a low frequency component which represents a broad gradation of the original image and a high frequency component which represents a local gradation of the original image;

means for compressing the low frequency component divided by said dividing means to lesser gray levels;

means for emphasizing the high frequency component divided by said dividing means; and means for composing the compressed low frequency component, compressed by said compressing means, and the emphasized high frequency component, emphasized by said emphasizing means, and recompressing gray levels of the composed signal.

8. A gray level converting method comprising the steps of:

dividing an original image with multiple gray levels into a low frequency component which represents a broad gradation and a high frequency component which represents a local gradation;

detecting an edge strength which is defined as the difference of the gray level between neighboring pixels of the original image; and changing a dividing characteristics used at said dividing steps in accordance with the edge strength determined at said edge strength detecting step.

9. The gray level converting method of claim 8, further comprising the steps of:

compressing the gray levels of the low frequency component divided at said dividing step; and composing the compressed low frequency component, compressed at said compressing step, with the high frequency component divided at said dividing step.

10. The gray level converting method of claim 8, wherein:

said characteristic changing step changes a characteristic for extracting the low frequency component in accordance with the edge strength determined at said edge strength detecting step; and said dividing step further comprises the steps of:

extracting the low frequency component from the original image using the low frequency component extracting characteristic changed at said characteristic changing step, and extracting the high frequency component in accordance with the original image and the low frequency component extracted at said low frequency component extracting step.

11. The gray level converting method of claim 8, wherein said characteristic changing step further comprises the steps of:

an edge extracting step of extracting pixels which are contained within a fixed number of the pixels on both sides of the edges detected by said edge strength detecting step from the original image; and a non-edge extracting step for extracting pixels excluding the pixels extracted at said edge extracting step, said dividing step extracting the low frequency component using an edge preserving smoothing operation for pixels extracted at said edge extracting step and using a non-edge preserving smoothing operation for pixels extracted at said non-edge extracting step.

12. The gray level converting method of claim 11, wherein said low frequency component extracting step makes the size of a filter which is utilized for extracting the low frequency component smaller as the edge strength detected at said edge strength detecting step becomes larger.

13. The gray level converting method of claim 8, wherein said low frequency component extracting step further comprises the steps of:

extracting pixels which are included within a fixed number of pixels on both sides of the edges detected at said edge strength detecting step; and extracting pixels excluding the pixels extracted at said edge pixel extracting step, said dividing step extracting the low frequency component using a filter of a relatively small size for pixels extracted at said edge pixel extracting step, and using a filter of a size larger than the relatively small size for pixels extracted at said non-edge pixel extracting step.

14. A program storage device readable by a machine, tangibly embodying a program of instructions executable by the machine, to perform the method of claim 8.

15. The gray level converting apparatus of claim 2, wherein:

said characteristic changing means changes a characteristic for extracting the low frequency component in accordance with the edge strength determined by said edge strength detecting means; and said dividing means further comprises:

means for extracting the low frequency component from the original image using the low frequency component extracting characteristic changed by said characteristic changing means, and means for extracting the high frequency component in accordance with the original image and the low frequency component extracted by said low frequency component extracting means.

16. The gray level converting method of claim 9, wherein:

said characteristic changing step changes a characteristic for extracting the low frequency component in accordance with the edge strength determined at said edge strength detecting step; and said dividing step further comprises the steps of:
extracting the low frequency component from the original image using the low frequency component extracting characteristic changed at said characteristic changing step, and
extracting the high frequency component in accordance with the original image and the low frequency component extracted at said low frequency component extracting step.

17. A program storage device readable by a machine, tangibly embodying a program of instructions executable by the machine, to perform the method of claim 9.

18. A program storage device readable by a machine, tangibly embodying a program of instructions executable by the machine, to perform the method of claim 10.

19. A program storage device readable by a machine, tangibly embodying a program of instructions executable by the machine, to perform the method of claim 16.

20. A program storage device readable by a machine, tangibly embodying a program of instructions executable by the machine, to perform the method of claim 11.

21. A program storage device readable by a machine, tangibly embodying a program of instructions executable by the machine, to perform the method of claim 12.

22. A program storage device readable by a machine, tangibly embodying a program of instructions executable by the machine, to perform the method of claim 13.

23. A gray level converting apparatus, comprising:
a divider dividing an original image with multiple gray levels into a low frequency component which represents a broad gradation and a high frequency component which represents a local gradation;
a detector detecting an edge strength which is defined as the difference of the gray levels between neighboring pixels of the original image; and a controller changing a dividing characteristic used in said divider in accordance with the edge strength determined by said edge strength detector.

24. The gray level converting apparatus of claim 23, further comprising:
a compressor compressing the gray levels of the low frequency component divided by said divider; and
a composer composing the compressed low frequency component compressed by said compressor with the high frequency component divided by said divider.

25. The gray level converting apparatus of claim 23, wherein:
said controller changes a characteristic for extracting the low frequency component in accordance with the edge strength determined by said edge strength detector; and
said divider further comprises:
a first extractor extracting the low frequency component from the original image using the low frequency component extracting characteristic changed by said controller, and
a second extractor extracting the high frequency component in accordance with the original image and the low frequency component extracted by said low frequency component extractor.

26. The gray level converting apparatus of claim 23, wherein said controller further comprises:
an edge extractor for extracting pixels which are contained within a fixed number of the pixels on both sides of the edges detected by said edge strength detector from the original image; and
a non-edge extractor extracting pixels excluding the pixels extracted by said edge extractor, said divider extracting the low frequency component using an edge preserving smoothing operation for pixels extracted by said edge extractor and using a non-edge preserving smoothing operation for pixels extracted by said non-edge extractor.

27. The gray level converting apparatus of claim 26, wherein said low frequency component extractor makes the size of a filter which is utilized for extracting the low frequency component smaller as the edge strength detected by said edge strength detector becomes larger.

28. The gray level converting apparatus of claim 23, wherein said first extractor further comprises:
an included pixel extractor extracting pixels which are included within a fixed number of pixels on both sides of the edges detected by said edge strength detector; and
an excluded pixel extractor extracting pixels excluding the pixels extracted by said included pixel extractor, said divider extracting the low frequency component using a filter of a relatively small size for pixels extracted by said edge extractor, and using a filter of a relatively larger size for pixels extracted by said non-edge extractor.

29. An infrared camera, comprising:
a device taking an original image to generate a signal corresponding to the intensity of an original image with multiple gray levels;
a divider dividing the signal generated by the original taking device into a low frequency component which represents a broad gradation of the original image and a high frequency component which represents a local gradation of the original image;
a compressor compressing the low frequency component divided by the divider to lesser gray levels;
an emphasizing unit emphasizing the high frequency component, divided by said divider; and
a composer composing the compressed low frequency component, compressed by said compressor, and the emphasized high frequency component, emphasized by said emphasizing unit, and recompressing gray levels of the composed signal.

* * * * *

UNITED STATES PATENT AND TRADEMARK OFFICE
CERTIFICATE OF CORRECTION

| | |
|---|---|
| PATENT NO. | : 6,343,158 B1 |
| DATED | : January 29, 2002 |
| INVENTOR(S) | : Morito Shiohara |

It is certified that error appears in the above-identified patent and that said Letters Patent is hereby corrected as shown below:

<u>Column 13,</u>
Line 55, change "characteristics" to -- characteristic, --.
Line 56, change "steps" to -- step, --.

<u>Column 15,</u>
Line 35, begin a new paragraph with "a controller".

Signed and Sealed this

Twenty-third Day of April, 2002

Attest:

Attesting Officer

JAMES E. ROGAN
Director of the United States Patent and Trademark Office